July 26, 1960   R. B. GALVIN   2,946,510
HIGH TEMPERATURE CONDUIT RADIANT OVERHEAD HEATING
Filed Aug. 4, 1954   4 Sheets-Sheet 1

INVENTOR.
Ralph B. Galvin
BY
ATTORNEY

July 26, 1960 R. B. GALVIN 2,946,510
HIGH TEMPERATURE CONDUIT RADIANT OVERHEAD HEATING
Filed Aug. 4, 1954 4 Sheets-Sheet 2

INVENTOR.
Ralph B. Galvin
BY
ATTORNEY

United States Patent Office 2,946,510
Patented July 26, 1960

2,946,510

HIGH TEMPERATURE CONDUIT RADIANT OVERHEAD HEATING

Ralph Broe Galvin, Seattle, Wash., assignor to Hi-Ro Heating Corporation, Arlington Heights, Ill., a corporation of Washington Filed Aug. 4, 1954, Ser. No. 447,872

13 Claims. (Cl. 237—70)

My invention and discovery relates to the art of high temperature conduit radiant overhead heating.

More particularly my invention and discovery relates to high temperature conduit infrared radiant overhead heating for buildings and is characterized by its special suitability and efficiency for buildings with high ceilings, light construction, large skylight areas, or roof ventilation, and for open and semi-enclosed areas.

My invention and discovery particularly involves the combining of three fundamental elements or factors as follows: (a) distribution of heat over the area by a high temperature conduit of closed-loop form disposed substantially horizontally; (b) combustion primary heat source characterized by its uniform high temperature combustion chamber and high heat transfer rate of infrared rays or energy through and/or from the combustion chamber wall; and (c) special secondary heat transfer surface of corrugated form characterized by its efficient absorption of said infrared rays from said combustion primary surface and its efficient transfer of said heat by convection to said circulating heating fluid in said loop conduit.

Herein I will disclose my invention and discovery particularly as it applies to the conditions and problems obtaining in industrial plants, such as machine shops, airplane hangars, and garages, and in public buildings such as schools, gymnasiums, partially sheltered play areas, churches and auditoriums. My invention and discovery is, of course, applicable to homes, stores, green houses, and outdoor areas such as patios, swimming pool borders, marquees, spectator stands, open air marts, cafes, operating areas around outside industrial machinery and the like. These are cited by way of illustration and not by way of limitation. As respects the overhead feature, my invention so far as same is employed in space heating as in rooms or living areas is functionally most efficient when employed in overhead heating. Such overhead positioning is important in order to obtain uniform heat distribution at the occupancy level due to the high concentration of infrared rays. The high temperature of the conduit for efficient radiation constitutes one of the outstanding features of my invention and discovery. All references to application of my invention in whole or in part which are made herein are by way of illustration and not limitation.

The said fundamental elements or factors of my invention and discovery as disclosed herein are given for optimum results for ordinary requirements. Nevertheless, many of the advantages of my said invention and discovery may be had with some departure therefrom and still be within the claims hereof. For example, but not limitation, if the conduit of my invention is not disposed horizontally, then sacrifice is made of the air trapping in avoiding convection currents or other complications.

A more special application of my invention and discovery is for industrial processing including heating and drying of thin and fabricated or porous material and is particularly suited for heating or drying substances with good absorption of relatively long wave length radiation such as heat-setting of nylon fabrics, softening for molding of thermoplastic sheet materials, curing of resins in paper and textile coatings and drying of aqueous coatings on paper and textiles. It may also be used advantageously where glass-enclosed radiant lamps are objectionable for safely reasons, or where a low temperature sources of infrared heat is desired. Some of the many other applications might include baking, food processing, curing and ripening, fermentation, control of chemical and biochemical reactions, and control of crystallization. The high temperature conduit of my invention and discovery provides a high concentration (that is, high intensity, i.e., large number of infrared rays per unit area) of infrared rays in the long lengths and excellent uniformity of distribution over a conveyor or other flat surface placed below it. This is in definite contrast to a local source of radiation as in the case of an infrared lamp bulb, even when arranged in banks. Hot air heating may be used to supplement infrared heating by raising the conveyor belt level under the extended sides of the insulated conduit of my invention. No special housing or tunnel is required and the process material may be visually inspected while it is being heated.

Also, the combustion furnace and each of its special features may be used separately, i.e., individually or in combination, for a wide variety of heating and heat-transfer applications. The combustion chamber and preheater may be used without the conduit, furnace casing, and secondary heat-transfer surface, as a source of very high intensity infrared heat which may be located under an insulated reflector hood and used as an overhead space heater. The furnace design features are suitable for aircraft heaters, and gas turbine combustion and heat-transfer components. The secondary heat-transfer members of special design can be used advantageously whenever or wherever heat is to be transferred from a high temperature primary surface to a surrounding flowing stream of fluid, transparent or semi-transparent, to infrared rays.

Prior overhead radiant heating systems generally are objectionable in that they are limited for use in buildings with insulated roof or ceiling construction and are not suitable for buildings with large skylight areas and roof ventilation because among other factors, of the high energy cost and shortage of electricity, and lack of dependability and absence of sufficient large plants in isolated areas such as in the Arctic.

The important factor of modulated control of building heat is not practical with prior art systems with arrangements of unit heaters each operating independently in its own zone. In contrast, modulated control of building heat is one of the very important features characterizing my invention.

Prior art space heating devices utilize the maximum practical temperature drop or heat content of the heating fluid through the heating element; in contrast, my invention utilizes only a small portion of the available temperature drop and heat content of the heating fluid through the heating element.

Also, prior art space heating elements as commonly used and so far as known to me are connected in parallel to high potential energy supply and low potential energy return headers or sources, whereas, in contrast, the heating elements, i.e., the sheets constituting the heating conduit of my invention are connected in series to the energy supply, i.e., the heat source, and the circulating heating fluid is maintained at a high potential energy level throughout the mechanism.

Further, prior art space heating mechanisms control the heat output by varying the quantity of flow of the heating fluid in each heating element during a given time period, whereas in my invention the heat output is controlled by varying the temperature of the circulating heating fluid and maintaining a large flow rate. The large flow rate is facilitated by the conduit being of a closed loop form. When the closed loop is of the simple unidirectional flow or ring-like form, the pressure drop of the circulating fluid medium is at a minimum and construction is simplified. However, the more complex forms of loops, such as the serpentine form, may, of course, be used in my invention and discovery.

Moreover, prior art space heating mechanisms use zone control of building heat by independent and separate operation of the heating elements each in its own zone, whereas in my invention modulated step-control of entire building heat is by on-off control of individual or groups of energy supply sources in series with the heating elements of the mechanism—"in series" in contrast with "parallel," i.e., the heating sources are contacted successively by the stream of heat-transfer medium.

Furthermore, prior art space heating mechanisms require various capacity size heat sources to suit individual building requirements as to use, volume, ceiling height, etc., whereas my invention can use a single capacity size heat source for practically all types of buildings.

Still furthermore, the mechanism of my invention can provide zone heat control by variation of conduit and reflector shapes, use of infrared reflecting paints, and adjustable shutters across the heating duct surface. Summer cooling may be provided by removal of hot ceiling air through special openings in the conduit for this purpose. The heating surface may also serve as a light reflecting surface by using a porcelain enamel or other coating.

Prior art radiant heating means each have limitations or objections peculiar to each as follows: High intensity infrared electrical heating mechanism of the prior art involves complications in providing thermal insulation due to the high heating element temperature. Both insulation and material problems present serious complications inherent in such electrical heating due to very high radiating element temperature of the order of fifteen hundred or more degrees which is projected directly into the space being heated. These complications are not inherent in the device embodying my invention where the heat source is relatively high but transfers its heat to a circulating fluid.

Various liquid heating fluids employed in overhead heating either have too low a temperature or they require too high pressure or they present critically severe hazards from fumes in the event of a possible leak or break in the conducting pipes. Present warm air ducts are of a low temperature level requiring close spacing of the ducts and insulated ceiling construction for adequate heating. Prior art devices with circulating air ducts connected by riser ducts between floors present a fire hazard to such a degree that they are subject to certain building regulations requiring the installation of fire dampers.

A primary object of my invention and discovery is to solve the various problems and overcome the objections and limitations set forth above. A primary purpose of my invention and discovery is to provide a high temperature conduit radiant heating mechanism characterized by its efficiency and economical construction and low maintenance and operating costs, its adaptability to being controlled for modulated building heating and one aesthetically and functionally conformable to architectural building forms.

One of the desirable and important features of my invention is to have the circulating heating fluid medium of a relatively high temperature for high intensity heat radiation of infra-red rays to the space to be heated. The conduit and furnace of my invention and discovery make most economical use of heat insulation material because of their compact construction within practical temperature limits of common materials, and are particularly suited for lightly constructed buildings.

Such feature as above described emphasizes the importance of providing a suitable economical heat source for maintaining the circulating heating fluid at a high temperature. This source should be lightweight for safe overhead support from light building roof structure and of small cross section to permit simple low cost installation within the high temperature conduit, and should use an economical source of heat energy.

Many types of commercially available, or easily made special, electric heat sources may be used where the cost of electricity is low, load factor is small, or utmost clean and quiet operation is required.

Several types of commercially available gas or oil fired warm air duct heaters may be used where the cost of fuel is low. These heaters are designed to operate efficiently when used with a moderate intake temperature circulating heating fluid such as room air, but will operate at reduced efficiency when used with high intake temperature circulating heating fluids.

However, most space heating installations require an efficient combustion source of heat energy for best economy. Combustion type heaters suitable for use with high intake temperature circulating heating fluids require the addition of a combustion air preheater to reduce stack gas temperature and obtain efficient operation. Combustion air preheaters are used to increase efficiency of large central station fuel fired boilers but compact, light weight preheaters required for efficient operation in my invention have not been developed suitable for use with space heaters.

Furthermore, high heat transfer rates are essential for lightweight, compact construction but require high primary source temperatures, particularly so when the circulating heating fluid medium is at an elevated temperature. High primary heat transfer surface temperatures require the use of high temperature corrosion resistant materials which are relatively expensive. Both cost and weight considerations indicate that heat transfer surfaces should be as thin as practical. Thin wall construction for light weight, and high temperature operation for high heat transfer rates and decrease in both size and weight, make it necessary to provide for axially symmetrical temperature distribution and independent expansion of all component parts to prevent warping or stressing due to thermal expansion—it being understood that the temperatures may vary longitudinally and radially. Also, since the heat transfer surfaces are characterized by extreme thinness, there can be no substantial heat transfer by conduction other than at right angles to the plane of their surfaces, making the use of fins or extended surface heat transfer surfaces impractical. Moreover, fin construction, due to differentiated temperatures, induces stresses. Still another requirement of a suitable furnace design is the limitation of the pressure drop of the circulating heating fluid medium through the furnace in order to keep the number and power requirements of the circulating fans low, particularly because of the necessity for large mass circulation imposed by the condition of small variation of the heating fluid temperature throughout the conduit.

It follows from the above that one of the important problems to be met in the development of a practical heating method is the design of an efficient, high temperature, thin walled, small diameter combustion furnace and air preheater particularly adapted for use with high intake temperature circulating heating fluids having moderate pressure drop through the furnace casing.

The combustion type furnace of my invention and discovery is characterized by its small cross section, and the use of thin, high temperature corrosion resistant material, and the arrangement of a uniformly high temperature radiating combustion chamber wall surrounded by special extensive but compact, convection cooled-radiant heat absorbing, uniform temperature, thin heat transfer surface, and with an extension to the combustion chamber containing a special counterflow concentric thin shell type air preheater discharging its preheated air through a ring of nozzles, disposed between gaps for the stream of outflowing combustion products, into the flue end of the combustion chamber around the opposite flowing flame and products of combustion and against the combustion chamber wall.

Very thin materials are used for the heat transfer surfaces since the heat is transferred directly through the walls at right angles to their surface planes so that no heat transfer by conduction is required in a direction parallel to these surface planes through the wall material, and each component surface is at a uniform temperature around its cross section and is free to expand independently of the others by means of sliding or cradle type supports so that no warping or stresses are caused by differential thermal expansion between these components.

The circulating heating fluid is heated by convection. The amount of heat transferred by convection is a function of the temperature difference, the surface area, the mass flow rate or velocity and the reciprocal of the mean hydraulic radius or the effective cross sectional area of each flowing stream. The temperature difference is limited by the requirement for a high circulating fluid temperature on the one side and the temperature limit of the wall material on the other side. The mass flow rate or velocity is limited by the requirement for moderate pressure drop. An increase in surface area by means of fins or extended surface on the combustion chamber wall or primary surface requires heavy wall construction and thick welds where the fins are attached to the walls for conduction of heat within the walls to the fin tips and introduces temperature gradients within the wall with resultant thermal stressing, and increases weight and cost of materials and fabrication. However, a high rate of radiant heat transfer from the combustion chamber wall forming the primary surface can be obtained within the temperature limit of the wall material if the surrounding surfaces are kept relatively cool. The surrounding or secondary surfaces will then absorb the radiant heat from the primary surface but must transfer this heat by convection to the circulating heating fluid. A cylindrical casing or a simple cylindrical shroud does not present a large enough surface for adequate convection heat transfer within the limitation for practical circulating heating fluid velocities. Indeed, the minimum casing diameter is determined by this maximum velocity and practical pressure drop.

To provide a high rate of heat transfer to the high temperature circulating heating fluid with practical velocity without the use of extended surfaces or fins on the primary surface, my invention provides a very large area and compact secondary heat transfer surface in the form of thin, short members relatively independent of each other and of deep and arched corrugated form which bear only on their outside edges against the casing of the furnace. The corrugations extend radially almost across the space between the casing and the combustion chamber wall or primary surface but preferably with sufficient clearance so that their inner edges do not bear on the primary surface, i.e. combustion chamber wall, in order to permit free expansion. The heat transfer from the primary surface to the surrounding secondary heat transfer surface is by radiation exclusively. This radiation may be considered as effectively concentrated in a radial direction and is distributed over the deep corrugated surface at approximately uniform intensity. The arched corrugations divide the space between the combustion chamber wall and the outer furnace casing through which the circulating heating fluid flows into a plurality of approximately equal channels cross-sectionally considered so that the film resistance to convection heat transfer remains practically the same for all channels and the effective hydraulic diameter of the flow paths is reduced for greatly improved convection heat transfer. These secondary heat transfer members are of short length and are staggered in alternate arrangement in order to increase the convection heat transfer rate by more uniform heating of the circulating heating fluid by exposing each stream first to one side and then to the opposite side of alternate members, and by increasing the useful turbulence of the stream by shortening the distance between leading edges. The circulating heating fluid flows through the furnace in a parallel path to the axis of the conduit and furnace with little change in direction and minimum pressure drop due to loss of velocity head. Indeed, there is no substantial change in velocity between that in the conduit of the circulating medium and that in the furnace. Uniform distribution of the radiant heat is obtained from the primary combustion wall surface in impinging upon the secondary surface. The secondary heat transfer members preferably may be of an arched form and may have a rather sharp oblique angle at their inner edge where the concentration of heat is greater than at the outer edge where a flatter area is exposed to the radial rays from the primary surface. Moreover, the arched form eliminates vibration and noisy operation of these members despite their extremely thin construction. The secondary heat transfer members add reinforcement and stiffness to the casing and shield the casing from direct radiant heat from the primary surface—thus permitting light uninsulated casing construction.

These special secondary heat transfer members provide a new and inexpensive way of fabricating a multiple of parallel effectively small diameter flow paths as well as obtaining a uniform intensity distribution of radiating infrared rays from the primary surface. My invention avoids uneven heat distribution and objectionable concentration of heat transfer. Uniformity of temperature and heat transfer is maintained in the various members with thin wall construction, that is with a minimum of material. Thinness of material, which is a particularly important feature of my invention, improves the heat transfer rate because heat flow is required only at right angles through the material.

At the operating temperature the major portion of heat from the primary surface is transferred by radiation. Since the rate of heat transfer by radiation varies with the 4th power of the absolute temperature whereas the rate of heat transfer by convection varies only directly with the temperature, there is less variation of primary surface temperatures with varying heat transfer rates when the mode of heat transfer is predominately by radiation rather than by convection. Where radiant heat transfer predominates, the primary surface will come up to temperature faster and will have greater uniformity of temperature despite variations in flame temperature, heat release rates, or heat transfer rates which may occur along the length of the combustion chamber. Flame stability is improved by providing sufficiently hot wall temperatures throughout the length of the furnace and higher average wall temperatures may be obtained without overheating of the highest temperature zones. As materials are developed suitable for higher operating temperatures, the advantage of radiant type primary heat sources, as taught and disclosed by my invention, over convection types will increase.

It is most desirable to have a uniform flame temperature through the length of the combustion chamber to obtain uniform combustion chamber wall temperatures and maximum heat transfer within the temperature limit of the material and to obtain good fuel vaporization and flame stability near the burner tip without the need for costly and bulky refractory elements. In the case of conventional burners where the combustion air is fed into the burner end of the combustion chamber, the quantity and turbulence of relatively cold air available to support combustion is a maximum in the burner end of the combustion chamber and decreases toward the flue end so that the temperature of the flame increases toward the flue end. In order to keep the flame in such conventional furnaces hot enough to support combustion and vaporize the fuel at the burner end, the combustion air may be divided into primary and secondary streams or mixing of the combustion air into the fuel and flame may be otherwise retarded, and refractory material or walls arranged for low heat transfer rates may be used around the burner tip to slow or prevent heat transfer from the flame.

The above-mentioned general objects of my invention, together with others inherent in the same, are attained by the mechanism illustrated in the following drawings, throughout which like reference numerals indicate like parts:

Fig. 27 is a detached view in side elevation of an air preheater member of the furnace shown in Fig. 24 with cut away portion showing the inner shell;

Fig. 29 is a cross section of still another modified form of preheater and flue extension arrangement, showing the use of shell reinforcing rings with spacers on the middle ring for centering the preheater;

Figure 1:
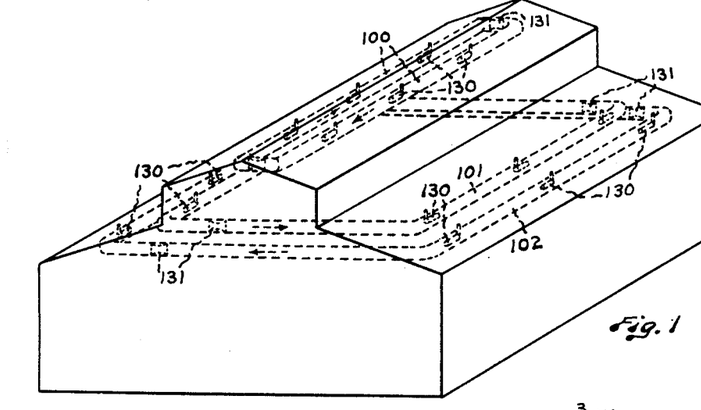
Figure 1 is a view in perspective of the high temperature conduit radiant overhead heat mechanism of the preferred form of my invention applied in transparent manner to a building and showing three separate and independent system loops of the heating circulating fluid conduits.

Figure 1 shows an industrial factory or airplane hanger provided with a preferred form of my invention as a loop or conduit 100 forming a complete unit of the closed looped conduit constituting the heating unit of my invention and discovery. Said factory may be supplied with a plurality of said loops such as the additional loops 101 and 102, each loop being a separate and complete closed unit in the preferred form of my invention. The conduit is preferably of the crescent shape as shown longitudinally in Fig. 2 and in cross section in Fig. 3, said crescent shape having the bottom of the conduit or lower sheet 103 constituting the actual direct space heating element. The upper conduit wall or inside sheet 104 is surrounded by insulating body 105 of semicircular shape cross sectionally considered. The sides 106 and 107 extend below the lower or bottom edge of lower sheet 103 to provide a pocket below said lower sheet for the retention of the heated air against removal by convection currents or drafts which would remove the heated air and thereby reduce by so much the efficiency of the heating element, lower sheet 103. It will be understood that the conduit 100 will convey circulated heating fluid, preferably of gaseous form such as air or water vapor which will cause infrared rays to radiate from the exposed lower wall or sheet 103. The circulating heating fluid may be a non-radiating fluid such as air so that heat transfer from the fluid must be by convection to the walls of the conduit, and the exposed walls of the conduit such as lower sheet 103 become the direct infrared producing or heating elements; or the circulating heating fluid may be a radiating fluid such as water vapor or carton dioxide so that heat transfer from the fluid may be both by convection and radiation to the walls of the conduit, and the exposed wall of the conduit such as lower sheet 103 may be of transparent and non-absorbing material to infrared rays such as glass, particularly such as is used in infrared lamps, so that the circulating heating fluid and the non- transparent portion of the conduit wall such as upper sheet 104 become the direct infrared heating elements to the area below. It will be further understood that the circulating fluids, conduit walls, and wall surfacing materials may be selected to provide the desired combination of absorption, emission, transparency, and reflection of infrared rays for obtaining various infrared wave length band concentrations. Accordingly, when the term "heating conduit" is used herein it is meant in its broadest scope to include the circulating fluid as a radiant body as well as the walls of the conduit. The side members 106 and 107 may rest upon horizontal bracket 108 supported by suspending means as cables or rods 109 and 110 which suspension means are secured to overhead roof members (not shown). The insulating body 105 and its extension 105a and 105b in the side members 106 and 107 insures efficient operation of the conduit 100. This is particularly important where the roof is uninsulated.

Figure 4:
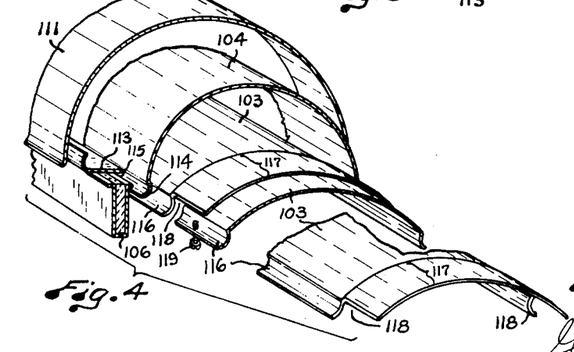
Fig. 4 is a view in perspective showing successive conduit-forming sheets cut away to expose sheets therebeneath and show in perspective a juncture of the conduit-forming sheets, which juncture is expandable longitudinally.

The detail construction of the conduit of the preferred form may be as follows: The insulated body 105 may be formed on its inner wall by the upper wall or sheet 104 forming part of the conduit and in spaced relation thereto to a cover sheet 111 which is bent into a semicircular form which may conform to the curvature of the upper wall 104 of the conduit, thus making a semicircular compartment for insulating body 105. The base of said sheet may be secured by rivets 112 to a joining aligning and supporting strip 113 which has an upturned flange which receives the inner portion of securing rivet means 112. The bottom edge 114 of sheet 104 may be advantageously bent over the inner edge 115 of joining strip 113. The bottom edge of sheet 103 correspondingly is bent over the bottom edge 114 of sheet 104, see Fig. 3 and Fig. 4. The forward end portion 117 of lower sheet 103 is preferably offset to overlap the rear end portion of the next forwardly positioned lower sheet 103. See Fig. 4. Said offset end portion 117 of lower sheet 103 has its formed side edges cut off at 118, so that an expandable joint is provided and misalignment of the edges is prevented. The cut off edge 118 prevents the multiplying of thickness of the sheets at the juncture of the edges of sheets 104 and 103. The forward end portion of upper sheet 104 is similarly formed and provides a similarly expandable joint (not shown) to that described for lower sheet 103. Pin 119 extends through the rear end edge portion of sheet 103 and the rear end edge portion of sheet 104 and joining strip 113, see Figs. 3 and 4. In this manner, the rear of sheets 103 and 104 are securely fastened and anchored to the joining aligning and supporting strip 113, thus providing for holding the sheets in proper alignment and yet providing for their unanchored front edge portions to expand and be relatively movable longitudinally. The upwardly bowed or arched character of sheets 103 and 104 provides for their vertical and crosswise expansion. The construction and character of the juncture of sheets 103 and 104 provides for their maintaining tight fitting as the pressure of the circulated fluid within the duct presses the overlapping curved edges together and against the aligning edge of the joining strip 113. The arching of said sheets 104 and 103 of natural flat form adds a flexing force for maintaining tight joints along their engaged side edges and provides rigidity for maintaining closely fitted expansion joint overlaps at the ends. The construction of the conduit 100 provides for an extended radiated heating surface, i.e., heating element 103, and at the same time a construction which is adapted to the shipment of the conduits in flat sheet form with the edges preformed.

Figures 2, 3:
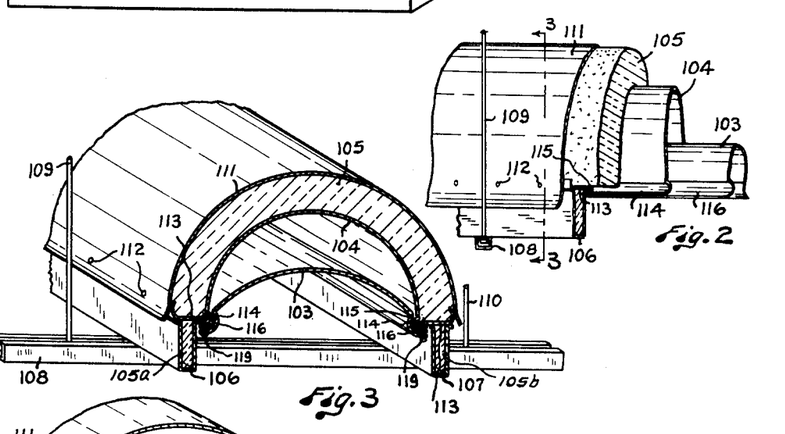
Fig. 2 is a view in side elevation of the duct of my invention with parts cut away, and which also shows the side view of a mounting bracket for suspending said conduit from overhead building members.
Fig. 3 is a view in perspective of the conduit of my invention and a cross section on dotted line 3—3 of Fig. 2 of the conduit.

The insulated body 105 provides for maintaining the heating of the elements or sheets 103 and 104 at their maximum efficiency in the production of infrared rays, and the directional distribution of the rays to the space below, upper sheet 104 acting in a supplementary manner for the heating of lower sheet or heating element 103.

The extended sides 106 and 107 below the heating element or lower sheet 103 provide a pocket for entrapping still air which contributes to maintaining the heating element 103 at its more efficient infrared producing temperature by the prevention of heat loss due to convection currents of air and conduction of heat to the space air below.

I have particularly devised a construction for the conduit which permits the employing in this construction metal sheets of standard size. I have found for heating element 103 that a sheet of 26 gauge and 36 inches wide by 6, 8 or 10 feet long is a convenient proportion to provide a radiating area of efficient size and economy of construction. In connection with said sized sheet for heater element 103, I find a sheet of thin gauge for the upper sheet 104 and of a width of 48 inches and of a length corresponding to that of sheet 103 provides a conduit characterized by the proper cross-sectional flow path area and the proper radiating surface area. Where different lengths are desired subdivision of the standard lengths provides the desired length in most cases. The above also applies to the cover sheet 111.

Conduits 100, 101 and 102 constructed as above set forth may be provided separately and singly or in multiples of closed loops as shown in Figure 1.

The bottom conduit 102 is selected to be described herein by reason that it is more apart and consideration thereof will be more clear. It provides for perimeter heating while conduit 100 provides for a more central concentration and distribution of the infrared rays. However, the construction of the several conduits is the same, hence the description of one will suffice for the others.

In conduit 102, are located one or more heat sources 130 for heating the fluid medium which is circulated within the conduit to heat the heating element 103 of the conduit. The circulation of said heating fluid passes around the combustion chamber of the furnace or other heat source 130 in being heated and is not interrupted and is substantially unidirectional in its circulating path. In the case of electrical heating source the fluid would pass by the heating elements of such electrical means, and likewise for gas or other type of heating source. One or more fans or circulators 131 for circulating the heating fluid are included within the conduit 102 or flow path of the fluid medium. Thus, a positive circulation of the fluid medium is affected in maintaining a relatively large mass flow rate of heated medium and thereby maintain a high ratio of mass of circulating heating fluid to the unit heat output of each source or furnace in causing them to functionally cooperate in providing a small variation in temperature of the circulating heating fluid throughout the entire loop of the conduit. Moreover, the excess of fluid temperature over the conduit surface heating temperature may be utilized in offsetting pressure drop, i.e., such excess permits offsetting some pressure drop by providing the temperature drop without substantially interfering with the substantial uniformity of temperature of the circulating fluid which may be required for producing the infrared rays. Thus my invention provides for a simple offsetting for the pressure drop through control of the temperature. The result of such mode of cooperation is an even distribution of the infrared radiation. Moreover, such operation avoids the undue heating at any one location which would result in inefficiency and possible danger as a fire hazard. Further, the avoiding of temperature changes in the heating fluid by large mass circulation provides for automatically limiting the maximum temperature close to the most desired operating temperature. The above operation simplifies the designing and choice of materials for constructing the equipment involved, since extreme temperature variations are avoided. The closed construction of the conduits is functionally necessary for efficient operation with a large mass flow rate of high temperature circulating heating fluid.

Figure 5:
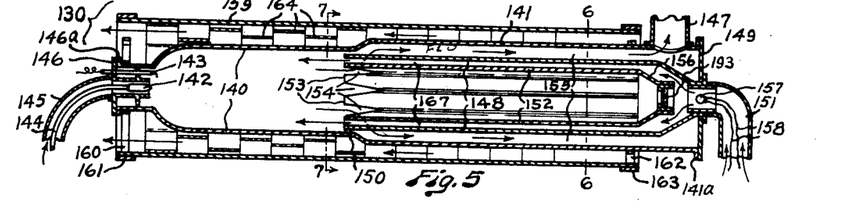
Fig. 5 is a view in longitudinal vertical section of one form of a heat source or furnace suitable for mounting in said conduits, which furnace maintains the circulating fluid confined in said conduits at a predetermined temperature, particularly illustrating the courses of flow of the combustion air, flue gases and the circulating heating fluid.
Figures 18, 19:
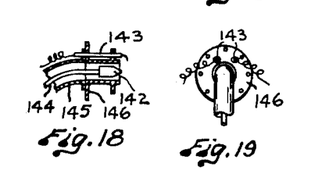
Fig. 18 is a view in side elevation of the burner assembly showing the nozzle, ignition electrode, and cooling air jacket for the burner end seal.
Fig. 19 is a view in end elevation of said burner assembly.

In Figs. 5 to 23 inclusive, is shown one form of the furnace or heating source 130 of my invention and discovery which is disposed in said conduits 100, 101 and 102 in providing for the heating of the fluid medium. Such furnace may employ powdered, liquid, or gaseous fuel. In Fig. 5 is shown a combustion chamber shell 140 with integral flue extension portion 141, provided with a burner having a fuel nozzle 142 and ignition electrodes 143 mounted on burner bracket and air seal member 146 (see also Figs. 18 and 19). Said nozzle 142 has fuel supply conduit 144. A conduit 145 is preferably employed to provide a cooling jacket of forced air for the fuel conduit, and moreover provides for sealing against the nuisance leakage of furnace gases into the circulating heating fluid medium. I find with certain standard types of nozzles that such supplementary cooling of the fuel and the nozzle is important for preventing carbonation and plugging of the fuel within the nozzle. The pressure of the said cooling air in conduit 145 exceeds the combustion chamber pressure and thus even nuisance leakage is eliminated. This is important in many applications, for example, in household and hospital applications where odors are particularly objectionable. A stack 147 conducts combustion gases through the conduit 102 to the atmosphere. The flue extension portion 141 is enlarged and corrugated so as to receive or contain the outer shell 148 of the air preheater which is mounted as to one end, in the stack end plate 149 and, as to the other end, is supported by sliding bearing upon the cylindrical wall of the combustion chamber at 150. The efficient operation of the furnace of my invention renders important the disposing of its elements in precise spaced relation so that there is a proper proportion of adjacent combustion air and flue gas streams through the preheater and, more important, a proper proportion of combustion air around the fuel spray and flame. Hence the forward bearing 150 provides for careful centering of the air preheater, and the corrugated form of the flue extension and preheater parts provides rigidity for maintaining the shape of the parts to be held in proper space relationship providing equal clearance between and around said parts for symmetrical flow distribution of the furnace combustion air and flue gases. Conduit 151 conducts combustion air through the conduit 102 to the stack end of the air preheater.

An inner shell 152 of the air preheater is concentrically disposed within the outer shell 148 providing passageway or space 167. The burner or discharge end of the air preheater is provided with combustion air passageways or nozzles 153 for the admission of the preheated air to the combustion chamber proper, and said end is also provided with openings or slots 154 for the escape of the burnt combustion gas to the annular space 155 disposed between the outer shell 148 and the flue extension portion 141. In the converging end 156 of the inner shell 152 is a glass window 193 which admits light to the photoelectric cell 157 located on the center axis of the said inner shell 152 in the opening in the stack end plate 149. Electrical conductors 158 connect the said electric cell to a flame failure safety shutdown device of standard construction (not shown).

Figure 6:
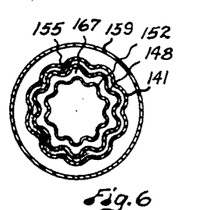
Fig. 6 is a view in cross section on dotted line 6—6 of Fig. 5, particularly illustrating the concentric arrangement of the shells forming the preheater portion of the furnace.
Figure 7:
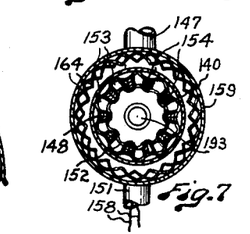
Fig. 7 is a view in cross section on dotted line 7—7 of Fig. 5, through the combustion chamber looking toward the discharge end of the air preheater, particularly illustrating the arrangement of alternating combustion air discharge nozzles and flue gas passage slots, and showing the alternating positions of the secondary heat transfer surfaces.
Figure 9:
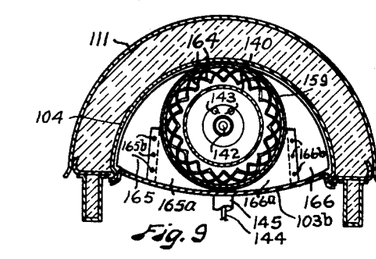
Fig. 9 is a view in cross section of Fig. 8 on dotted line 9—9 through the combustion chamber looking toward the burner end of said furnace.
Figures 10, 11:
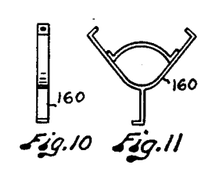
Fig. 10 is a longitudinal view in elevation of the burner end mounting yoke.
Fig. 11 is an end view of said burner end mounting yoke.
Figure 12:
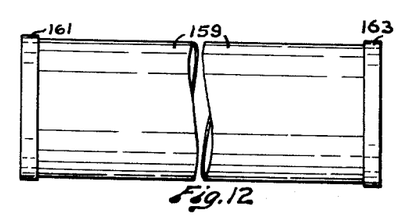
Fig. 12 is a fragmentary longitudinal view in elevation of the furnace casing.
Figure 13:
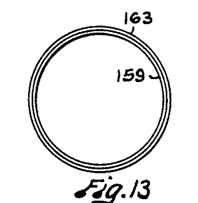
Fig. 13 is an end view of said furnace casing.

The cylindrical combustion chamber shell 140 is concentric with cylindrical furnace casing 159 (Figs. 12 and 13) which is supported at the nozzle end by the burner end yoke 160 (Figs. 10 and 11) which in turn is supported by reinforcing ring 161. At the opposite or stack end of the furnace, the casing 159 is supported by stack end yoke 162 (Figs. 16 and 17) bearing upon reinforcing ring 163. Secondary heat transfer surface members 164, of a corrugated short cylindrical form (see Figs. 14 and 15) heated by radiation from the combustion shell 140 and cooled by convection by the circulating fluid medium of the conduit 102, are disposed in coaxial, alternate angular positions between the furnace casing 159 and the combustion chamber shell 140, said heat transfer members 164 are held in place by their circumferential surface bearing upon the furnace casing 159. The design is such that no stress on any of the members occurs—freedom of thermal expansion is fully provided. These heat transfer members 164 preferably do not contact the shell 140 so that each is entirely free to expand independently under the influence of heating. In Figs. 6 and 7 are cross-sectional views on broken lines 6—6 and 7—7 of Fig. 5, showing the shape of the annularly disposed flow paths through the furnace in the preheater and combustion chamber, respectively. Fig. 6 shows the concentric flow path arrangement through the preheater portion. The flue gas passage is defined by extension wall 141 and preheater shell 148. The circulating heating fluid path surrounds the outside of said flue gas passage and is contained within the casing 159. The combustion air path surrounds the inside of said flue gas passage and is contained within the double preheater shells 152 and 148. Fig. 7 shows a view of the air discharge end of the preheater illustrating the annular arrangement of alternating air nozzles 153 and the flue gas slots 154, and showing the staggered positioning of the secondary heat transfer members 164 in the circulating heating fluid stream surrounding the combustion chamber 140. In Fig. 9 is shown two wings or transverse baffles 165 and 166 having detachable segments 165a and 166a for facilitating assembling—said segments being held by screws 165b and 166b. Said baffles loosely close off the space on each side between the furnace case 159 and upper sheet 104 and lower sheet 103b which is the sheet 103 at the furnace location in the loop modified in its arching to curve downwardly to provide room for the mounting of the furnace 130 therein. Thus, these baffle plates 165 and 166 compel substantially all of the circulating heating fluid to pass between the combustion chamber shell 140 and the furnace casing 159. Only enough circulating heating fluid is allowed by said loose mounting of the baffles to bypass around the outside of the furnace casing 159 to prevent the building up of a high temperature heating fluid pocket and excessive heating of the conduit walls in the sheets 104 and 103b is prevented.

Figure 8:
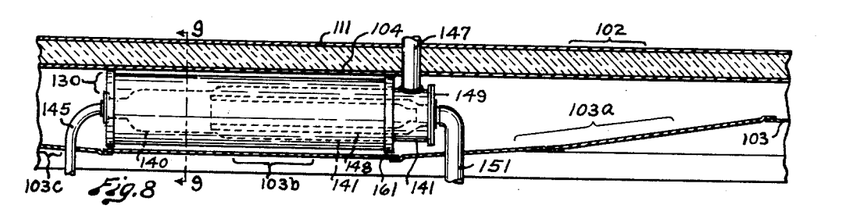
Fig. 8 is a longitudinal vertical view of the furnace of Fig. 5 mounted in the conduit shown in section, which furnace maintains the circulating fluid confined in said conduit at a predetermined temperature.

In Fig. 8 is a longitudinal sectional view of the conduit 102 showing a view in longitudinal elevation of the furnace 130 located therein. The transition portion 103a of the sheet 103 is shown as it extends or expands to the convex form in becoming the portion 103b beneath the furnace 130 (as shown in cross section in Fig. 9) and then forms the transition portion 103c in passing to the concave form of the conduit.

Figures 20, 21, 22, 23:
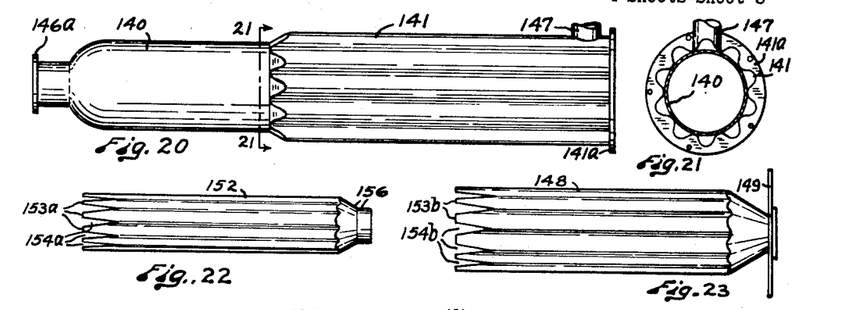
Fig. 20 is a longitudinal view in side elevation of the combustion chamber and flue extension of the furnace of Fig. 5.
Fig. 21 is a sectional view on line 21—21 of Fig. 20, with parts in elevation, of the combustion chamber.
Fig. 22 is a detached elevational view of the air preheater inner shell member of the furnace of Fig. 5.
Fig. 23 is a detached elevational view of the air preheater outer shell member of the furnace of Fig. 5.

In Fig. 20 is a separate view in longitudinal side elevation of the combustion chamber 140 and flue extension portion 141.

In Fig. 21 is shown the combustion chamber 140 in cross section and the corrugated flue extension portion 141 in end elevation with its flange 141a.

In Fig. 22, is shown the inner shell 152, preferably corrugated, with the slots 154a and intermediate formed end members 153a which, when jointed with corresponding end members 153b of the outer shell 148, form nozzles 153.

In Fig. 23 is shown the outer shell 148, preferably corrugated, with the slots 154b, with end members 153b which, when joined with corresponding members 153a, form nozzles 153 and slots 154.

Figure 24:
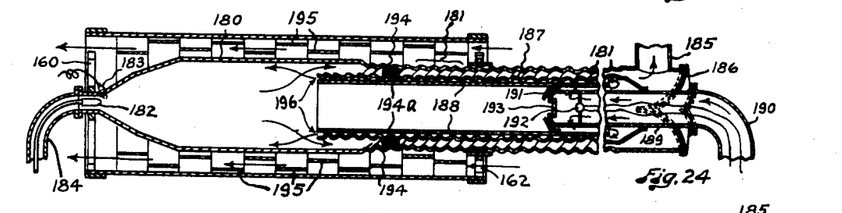
Fig. 24 is a view of a modified form of furnace in longitudinal vertical section, particularly illustrating the air preheater and flue extenson arranged for long spiral flow paths of air and flue gases.
Figures 25, 26:
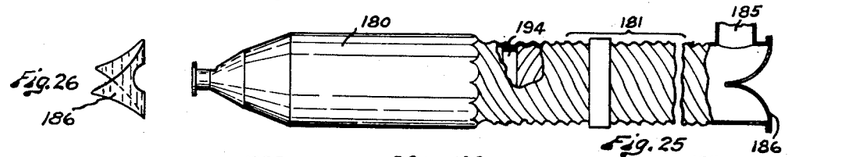
Fig. 25 is a detached view in side elevation of the combustion chamber and flue extension member of the furnace shown in Fig. 24, with cut away portion showing centering ring for air preheater member.
Fig. 26 is a view in perspective of the stack end plate of Fig. 24.

In Figs. 24-28 is shown a modified form of heat source 130 of my invention in which Fig. 24 is a longitudinal sectional view having a combustion chamber shell 180 of circular form cross-sectionally considered with integral contracted flue extension portion 181 of preferably spiral and corrugated form. Fig. 25 is a separate longitudinal view of the combustion chamber shell 180 and its flue extension portion 181. Said combustion chamber 180 has burner with fuel nozzle 182 and starting ignition spark plug 183, and burner end cooling air pressure seal conduit 184. A stack 185 conducts combustion flue gases through the conduit 102 to the atmosphere.

The flue extension portion 181 is contracted on its cross section for more compact and lighter weight construction; said portion 181 is preferably corrugated and of spiral form and receives or contains the outershell 187 of the combustion air preheater which is correspondingly corrugated and of spiral form.

Fig. 26 is a perspective view of rounded stack end plate 186.

The preheater (Figs. 24 and 27) has the inner-shell 188 which may be of spiral or plain cylindrical form. The object of the corrugated spiral form of the preheater shell 187 is to lengthen the path of the heat transfer fluids through the preheater elements without increasing the overall length of the furnace.

The heated combustion air is discharged through nozzles or openings 196 with both an axial and a radial velocity component directing this air axially toward the burner and radially against the combustion chamber wall 180. Hence the combustion air circulates against the wall and around the flame despite the air nozzle circle diameter being smaller than the combustion chamber wall diameter.

A radial velocity component may also be obtained with straight axial parallel passageways through the preheater as in Fig. 5 if the axes of the nozzles are disposed at an angle to the furnace axis.

The cylindrical housing 189 contains flame viewing window 193 and photo cell 192, and connects with air inlet 190 for the admission of cold combustion forced air around the photo cell and back into the air inlet end of the preheater through the passage way formed with the inner shell 188 and mounting means 191—thus forming a closing assembly or member. The photo cell 192 operates as a flame failure safety shut down device as it is exposed through window 193 to the flame within combustion chamber 180. Centering ring 194 welded to flue extension 181 is preferably provided to support and center the burner end portion of preheater 186 with corresponding inner ring 194a welded to preheater 187. Secondary heat transfer surface members 195 heated by radiation transfer their heat by convection to the circulating heating fluid medium of the loop 102.

Figure 17:
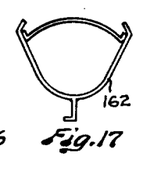
Fig. 17 is an end view of said stack end yoke mounting member.

Fig. 29, another modified form of the flue extension and preheater shell arrangement, is shown in cross section to show the use of three stiffening or reinforcing rings (not cross hatched) 197a, 197b and 197c disposed externally respectively to each of the three shells (cross hatched) 198a, 198b and 198c, and to show the use of spacers or spring clips 199 fastened to the outer preheater shell reinforcing ring 197b for centering the preheater within the flue extension shell 198a. This arrangement provides stiffening of the concentric corrugated shells at their points of support, and permits easy assembly of the preheater shell 198b into the flue extension shell 198a since the spacers 199 may be positioned in the valleys of the extension shell 198a during insertion and then the preheater shell 198b is given a slight twist to position it in proper angular relationship with the extension shell 198a. Outer ring 197a may be supported in any suitable manner within a conduit, such as by yoke 162 (Fig. 17).

In the above-described furnaces of my invention and discovery as shown in Figs. 5 to 29, the combustion air is fed around the opposite flowing products of combustion and flame, and against the combustion chamber wall 140 of Fig. 5 or 180 of Fig. 24 so that it gradually mixes or diffuses or is entrained by the products of combustion and flame and fuel particles as it approaches the burner nozzle end of the combustion chamber. Furthermore, the combustion air gradually increases in temperature by contact with the combustion chamber wall and entrained products of combustion as it approaches the burner nozzle end of the combustion chamber. The resultant effect is a decrease in the amount of excess air available to support combustion and an increase in the temperature of this air near the fuel nozzle end of the combustion chamber so that flame temperatures and furnace heat transfer rates through the combustion chamber walls are quite uniform over the length of the combustion chamber permitting high and uniform heat transfer rates over the entire length of the combustion chamber and obtaining good flame stability and preventing soot from forming on the walls and keeping the walls clear of any formation of a relatively cold low velocity film of infrared absorbing combustion gas film. It provides for clean combustion with very little turbulence and low pressure drop through the combustion chamber. It reduces size, weight and cost by eliminating need for refractory and utilizes the entire combustion chamber wall for maximum heat transfer. A portion of the air for combustion travels the full length of the combustion chamber and combines with the fuel on its way back through the center portion of the flame. This proportion is determined by the velocity and shape of the jets by which the combustion air is fed into the combustion chamber, and by the length of the combustion chamber and by the angle of the jet stream from the combustion chamber wall. The amount of entrainment or mixing of products of combustion into the surrounding stream of combustion air is less when the stream of air contacts the combustion chamber wall than it would be if the jet surface were spaced away from the wall. In order to obtain maximum travel with minimum entrainment and low pressure drop, the nozzles 196 of Fig. 24 are pointed at an angle from the furnace axis toward the combustion chamber wall 180, since these nozzles are spaced some distance away from the combustion chamber wall 180 so that the air streams will flow next to the wall surface.

Combustion takes place wherever the atomized fuel particle strikes an air particle since temperatures are adequately high to support combustion throughout the entire furnace. The fuel may be sprayed into the furnace in a conical shape and a portion of the fuel particles will impinge into the combustion air film against the furnace wall and combustion will take place within this air stream. The envelope of air moving counter to the flame will be continuously feeding combustion air on its inner surface to the flame so that the combustion air stream is being introduced in my invention and discovery in a manner which spreads its feeding over an extended length of the combustion chamber 140 of Fig. 5 or 180 of Fig. 24 and it does this in a continuous manner so that there is no sudden injection or mixing of the combustion fuel or air but there is a gradual supplying of heated combustion air for supporting the flame along the entire length of the combustion chamber thus definitely contrasting with the radial jet and other means of introduction of the combustion air into the fuel which result in high turbulence and sudden mixing. The construction of the invention herein set forth contrasts with those of burners wherein the combustion air is fed around the flame but in the same direction with the flame and products of combustion. Such burners may have a gradual mixing of the combustion air with the fuel over the length of the flame but have the coldest air and maximum turbulence at the burner end of the combustion chamber which militates against flame stability and uniform flame temperature. Also the rate of mixing of the combustion air into the fuel and the resultant heat release rate and flame length are sensitive to the relative velocities of the fuel and air streams. This is a disadvantage where the furnace length is fixed by design and variations in velocity may occur due to slight variations in voltage supplying the fan or fuel pump motors, etc. With my design the combustion heat release rate pattern is determined primarily by the shape of the fuel spray. Any combustion air that does not combine with the fuel while it is traveling around the flame and in the opposite direction to the flame travel will mix with the fuel or flame or products of combustion near the center of the combustion chamber as this air travels back out towards the flue end of the furnace. The combustion air of my invention and discovery is fed into the flue end of the combustion chamber in a counter current direction with or without a tangential swirl through multiple nozzles 153 of Fig. 5 and 196 of Fig. 24 arranged in a ring with spaces 154 of Fig. 5 and 196a of Fig. 24 between them for passage of the counter flowing products of combustion or flue gas, the two streams crossing each other in an interlaced manner. The incoming jets of combustion air and the outgoing streams of products of combustion form interlacing paths between the combustion chamber portion and the flue extension portion which permit a uniform and symmetrical distribution around each of said portions while providing for the crossing of the air jets and gas streams between said portions of the furnace. This is a very important feature of the invention and discovery in that it provides for a most efficient transfer of heat from the flue gas extension portion of the furnace to both heat transfer surfaces 141 and 148 of Fig. 5, and 181 and 187 of Fig. 24 and also simplifies design of the preheater. The maintenance of the symmetry of the introduction of the combustion air and the outgoing combustion flue gas provides for the proper distribution of combustion air, as well as the proportioning of the air with the fuel spray, flame, and products of combustion. The counterflow envelope of combustion air surrounding the flame and fuel spray provide for an elongated flame of uniform temperature throughout its length and this provides for maximum utilization of the combustion chamber wall for heat transfer in a compact furnace structure.

This interlacing of air and flue gas streams, i.e. passing of one stream throught the other, gives us a furnace design providing an air envelope surrounding the flame on the combustion end of the furnace and a flue gas envelope surrounding the incoming cold combustion air on the flue end of the furnace without distortion of mixing proportions of air and products of combustion. On the one hand it is manifest, that is, advantageous in the combustion chamber to have the combustion air fed in an envelope about the flame. On the other hand it is desirable to make use of the heated flue gas to pass between incoming combustion air and the circulating heating fluid. Such arrangement of passing the exhausting flue gas between the two provides for maximum use and extraction of heat therefrom, since heat is transferred both to the circulating heating fluid on the one side and the cold incoming combustion air on the other. High rate of heat transfer and economical use of material will result in the flue end of the furnace where narrow channels or flow paths, such as 155 for flue gas and 167 for air in Fig. 5, are provided resulting in a small thickness of stream and high velocity which cooperate in providing high heat transfer rates. Economical and light weight construction is further enhanced by adapting my invention to use cylindrical and corrugated forms permitting the use of thin material while retaining necessary rigidity. All of the above features which have been set forth also are combined in providing an open space about the center axis which provides for direct sighting of the flame from the flue end of the furnace where is located a glass window 193 and a photo-electric cell 157 providing safety means for shutting down the furnace on flame failure. The direct discharge of the combustion air through openings or nozzles 153 of Fig. 5 or 196 of Fig. 24 located at the hot end of the preheater eliminates the need for closed header construction which simplifies construction and reduces cost and provides open end construction permitting the direct sighting of the flame through the center of the preheater to the photocell 157 located on the inlet end. Thus one of the outstanding features of my preheating means is the omission of any closed header on the hot end. The cylindrical and corrugated forms with the corrugations running either parallel to the furnace axis or spirally around it provide a very low cost, light weight, compact and efficient heat transfer arrangement. This shape gives the required rigidity for maintaining uniformity of flow path area cross-sectionally considered so important to proper distribution of combustion air and fuel and products of combustion for maintaining symmetrical operation despite the fact that the mechanism will be subjected to high temperatures which otherwise might operate to cause distortion of spacing between the three concentric shells forming the flue end of the furnace. This brings out the feature that there are no stresses developed of an objectionable character. The various component parts of the furnace are free to expand independently by the means of independent sliding or cradle type supports.

The furnace and preheater arrangement also eliminates the need for induced draft and unsightly long stacks protruding above the roof level for further reduction in weight, size and cost of the furnace. However, the use of forced draft alone requires the combustion chamber and air preheater to be under positive pressure which may exceed the conduit pressure. Portions of the furnace with products of combustion under pressure exceeding that of the surrounding circulating heating fluid medium must be gas tight with all non-gas tight joints or connections provided with purge air seals in order to keep products of combustion from entering the heating conduit.

The furnace of my invention and discovery is designed with a single piece combustion chamber and extension for housing the preheater providing gas tight construction from end to end. The small burner connection 146a, in the pressure end is sealed with an air purge through conduit 145 of Fig. 5. The larger preheater flange connection 141a, on the opposite end, is under stack pressure or substantially atmospheric pressure. This construction permits location of the furnace any place along the conduit regardless of the circulating heating fluid pressure without the nuisance leakage of combustion gases into the conduit 102.

Figures 28, 30, 31:
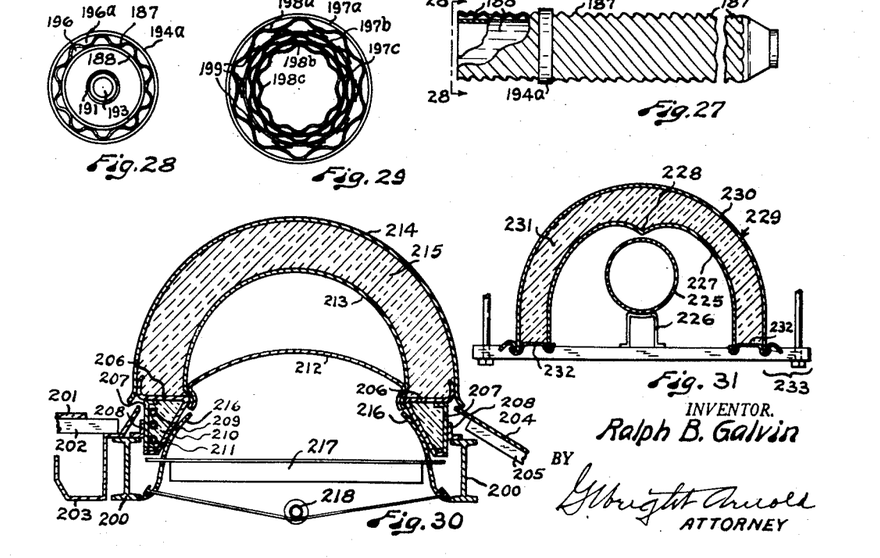
Fig. 28 is an end view looking in the direction of broken line 28—28 of Fig. 27, showing one arrangement of simply spaced-apart multiple air nozzles.
Fig. 30 is a view in cross section of the circulating fluid heating conduit of my invention with a modified form of roof mounting, the conduit being mounted on the roof truss of a building having a ventilating skylight on one side and a sloping roof or canopy on the other side, and illustrating the addition of louvre members for zone heat control, and lighting suspension below conduit light-reflecting surface.
Fig. 31 is a modified form of the conduit construction showing circular form disposed within the insulated divided reflecting conduit cover.

In Fig. 30 the modified form of the mounting of the heating conduit on roof structural members 200 is shown with a skylight 201 with supports 202 and gutter 203 on one side and on the other side the roof or canopy 204 with supports 205. Aligning strip 206 in the modified form with the channel member 207 forms a triangular mounting beam and insulation compartment. Angle clip 208 connects member 207 with roof member 200. The said beam structure is duplicated on the roof side 204. Said triangular mounting beam may house service conduits such as air 209, fuel oil 210, and electric wires 211.

The heating element or lower sheet 212 forming the conduit with upper duct wall 213 and cover sheet 214 with insulation body 215 are of similar construction to that shown in Fig. 3. Architectural trim 216 preferably is provided extending from the edges of sheet 212 to the bottom of truss member 200. Aluminum louvre members 217 extending transversely beneath the heating element 212 may be employed in directing the radiated infared rays as well as to cut off the same for providing zone heat control therebeneath.

Heating element 212 may be coated on its under side with porcelain enamel or other suitable light reflecting material to reflect light from a light source 218 suspended operatively beneath it. Also the louvres 217 may be employed as light reflecting means when closed. Heating element 212 may be made of various materials or coated with various surfacing to vary the infrared emissivity coefficient and provide non-adjustable zone heating variation to suit special requirements.

In Fig. 31, a modified form of the heating conduit is shown. In this instance the conduit or heating element 225 is of circular form cross-sectionally considered and may be supported by bracket 226 disposed at intervals along the length of the conduit. Reflector sheet 227, preferably formed of a divided curvature at reflector sheet center line 228, operates to reflect the upwardly and sidewise directed infrared rays emitted from the conduit or heating element 225 downwardly.

Reflector sheet 227 forms the bottom wall of the insulating compartment 229 which has cover sheet 230 which compartment may be filled with insulating material 231 in forming an insulating body having a joining strip 232 at bottom edges of sheets 227 and 230, the sides of which extend below the bottom of the conduit in preventing convection air currents from removing the heated air about conduit 225 as described above for heating element 103 of Fig. 3. Supporting bracket 233 for the conduit 225 and associated members may be secured to overhead structures.

Figures 32, 33:
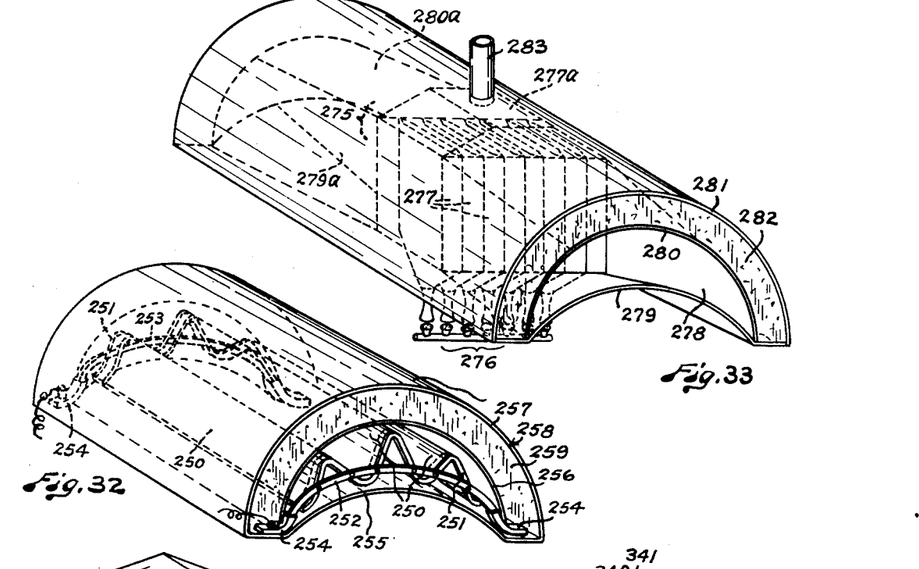
Fig. 32 is a view of one modified form of furnace showing the same in perspective, with electrical heating element shown in transparent manner within the conduit.
Fig. 33 is a view of still another modified form of a furnace, showing the same in perspective with one type of a gas duct heater shown in transparent manner within the conduit.

In Fig. 32 a modified form of heat source is shown, the same here being a corrugated thin sheet electrical heating element 250 which may be welded to distributing bars 251 supported by positive bus bar 252 and negative bus bar 253 (mountings 254 for the bus bars 252 and 253 being of electrical insulation material). The said electrical heating element 250 is located within the crescent-shaped conduit having lower conduit sheet and heating element 255 and upper conduit sheet 256 as described above for Fig. 3. Sheet 256 forms the bottom wall, and cover sheet 257 forms the upper wall of insulating compartment 258 which may have insulating material 259 forming an insulated body of said compartment. It will be understood, of course, that such electrical heating means may be of many varying forms and may include the conduit walls themselves when provided with electrically insulated supporting members.

Due to the large ratio of mass of circulating fluid to the heat input for any given section, and the small temperature variation in the circulating heating fluid medium, the electrical resistance heating element is particularly well adapted in all respects for use in my combination.

In Fig. 33, a still further modified form of heat source is shown employing one form of a standard commercial type of gas duct heater 275, here illustrated with multiple burners 276 below multiple narrow flues 277 forming the primary heating surfaces between which flues the conduit fluid medium circulates. This gas heat source is disposed under the cover sheet 281 with the crescent-shaped (cross-section) conduit 278 having lower heating sheet 279, upper sheet 280 and cover sheet 281—forming an insulating body 282 which tapers off above the heat source to provide required space for the heating flue manifold 277a. No insulation is required over the flues since the flue gas temperature exceeds the heating fluid temperature. Flue stack 283 extends through the cover sheet 281 in conducting flue gas to the atmosphere.

The commercial gas heat source 275 is inserted between transition sheets 279a and 280a the bottom of the commercial gas heater becomes for its length the lower sheet of the conduit. Thus, the gas burners 276 are below the conduit and are directly accessible. Such gas burner typifies one of many such standard forms of duct heaters.

Figures 34, 35, 36, 37:
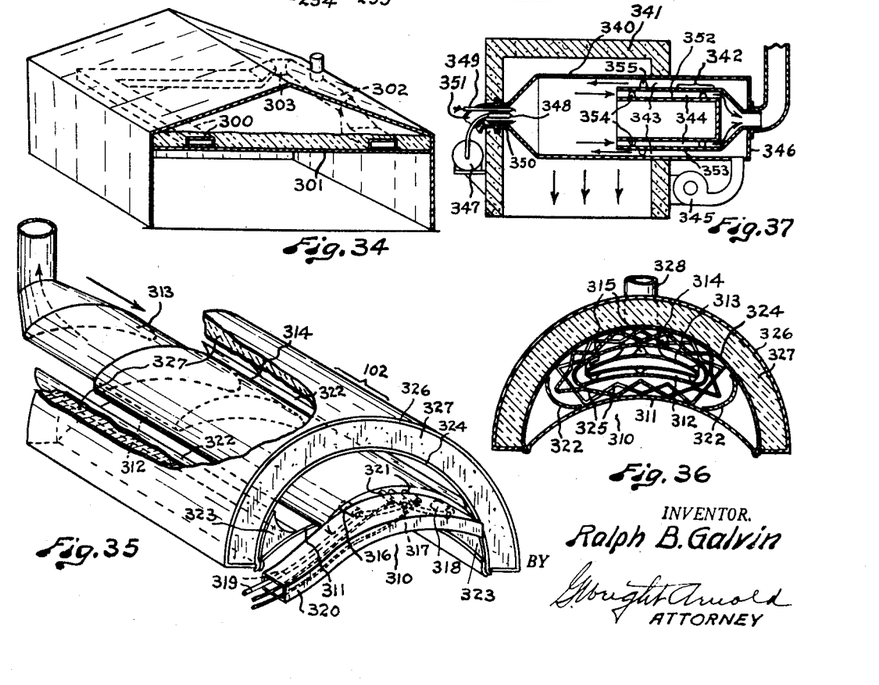
Fig. 34 is a view in perspective and cross sectional view of a typical dwelling with the heating element of my invention disposed in the attic and connected to the closed loop conduit mounted flush with the ceiling.
Fig. 35 is a view of yet another modified form of furnace, showing in perspective a non-circular combustion chamber and non-integral flue extension with surrounding flow path for a counterflow feed of a portion of the circulating heating air between the combustion chamber and the flue extension for supporting the combustion of fuel sprayed by multiple fuel nozzles into the combustion chamber in a cut away view of a conduit.
Fig. 36 is a view in cross section of the furnace of Fig. 35 through the combustion chamber looking toward the combustion air inlet surrounding the flue extension showing the arrangement of secondary heat transfer surface members in the circulating heating air stream between the combustion chamber and the conduit wall.
Fig. 37 is a view in longitudinal section of a modified form of a combustion chamber and preheater combination of my invention.

In Fig. 34 is shown a conduit 300 of rectangular form applied to a home or other building having an insulated ceiling 301. The conduit 300 may have its bottom wall flush with ceiling surface 301. The conduit 300 in this instance may not require the high temperature of conduit 102 of Figure 1 as applied to industrial uninsulated high ceiling installations above described. This conduit 300 leads to the furnace 302 and circulating blower 303 which portion of the conduit may (conveniently) be located in the attic and above the rest of the conduit.

In Figs. 35 and 36 is shown yet another form of combustion type furnace for use as a heat source 130 in conduit 102 of Figure 1. This furnace differs from those shown in Figs. 5 and 24 primarily in the deletion of the air preheater and in its cross-sectional shape made to conform closely with that of the crescent-shaped conduit 102. Combustion air is supplied by the circulating heating fluid (which in this case must be air) requiring a constant makeup of conduit air, preferably from the entrapped air pocket 310 below conduit lower sheet 311 at the inlet side of circulating fan 131 of Figure 1, providing a continuous purge of the entrapped air space 310 as well as the conduit 102. The air available for combustion is at the pressure of the circulating heating fluid which varies over the length of the conduit 102 depending primarily on the distance of the heat source 130 from the circulating fan 131. Hence the size of the combustion air inlet opening into the combustion chamber must be adjusted to the available pressure.

The combustion air enters the combustion chamber through the opening 312 between the flue extension 313 inside the combustion chamber wall 314. Sliding supports or spacers 315 center the flue extension 313 inside the combustion chamber wall 314. The area of the opening 312 may be reduced by means of baffles (not shown) attached to spacers 315 for limiting the combustion air flow in conduit locations with higher pressure and for adjusting the air pattern to correspond with the fuel spray pattern. As with the combustion furnaces of Figs. 5 and 24, the combustion air is fed in an envelope surrounding the flame and next to the combustion chamber wall 314, in a counter direction to the fuel spray, flame, and products of combustion, thereby providing uniform flame temperature and high heat transfer rates throughout the length of the combustion chamber 314. Multiple pressure type burner nozzles such as 316, 317, and 318 may be manifolded to fuel supply line 319, or a fish tail type burner (not shown) may be used to provide a thin, wide fuel spray pattern. Nozzle cooling air is provided by conduit 320 and ignition by electrodes 321. Side baffles 322 and end baffles 323 restrict the flow of circulating heating fluid through the corners of the crescent-shaped conduit formed by lower sheet 311 and upper sheet 324. Secondary heat transfer members 325 are located in the circulating heating fluid stream in the annular space surrounding the combustion chamber 314 and within the space defined by upper conduit sheet 24, lower sheet 311, and side baffles 322. The secondary heat transfer members 325 are supported by the conduit walls, upper sheet 324. and lower sheet 311. The conduit construction is similar to that of Fig. 3 with sheet 326 forming the cover for insulation 327. The flue extension 313 terminates in stack 328 which extends through the upper sheet 324, insulation 327, and cover sheet 326 for discharging the products of combustion to the atmosphere. No furnace casing is employed—the conduit walls 324 and 311 being substituted therefor. In Fig. 37, a sectional view in elevation is shown of an infrared combustion chamber 340 underneath a high temperature insulated reflector hood 341 with a combustion air preheater 342. This figure illustrates the application of the furnace of a modified form of my invention as a direct source of very high intensity infrared heat without any conduit, circulating heating fluid, or secondary heat-transfer surface. It shows a simplified air preheater construction formed by concentric shells 352 and 353 slidably mounted on supports 354 and 355, said construction being characterized by having the combustion air path 343 and the flue paths 344 interchanged in position from the positions shown in Figs. 5 and 24, i.e., in this instance the combustion air path 343 surrounds the flue path 344 while the reverse is true in Figs. 5 and 24. Fan 345 supplies combustion air under pressure to the stack end 346 of the furnace. Fuel pump 347 supplies fuel under pressure to burner nozzle 348. Ignition electrode 349 ignites the fuel. Flame sensing electrode 350 supplies shut down protection in case of flame failure. A segment of conduit 351 is preferably provided leading from fan 345 to provide cooling air to nozzle 348.

*Mode of operation*

The mode of operation of my invention and discovery has been set forth in large measure in connection with the description of the construction of the invention. There remains to be given an explanation as to the mode of operation of how the fundamental features cooperate to provide the desired results, together with a summary setting forth the mode of operation.

In general, it is evident from the foregoing disclosure that my invention and discovery involves three primary and fundamental features: (1) the method of distribution of the heat; (2) the providing of a suitable heat source for the circulating fluid within the conduit; (3) the transfer of the heat from the heat source to the circulating fluid in the conduit.

Relative to the distribution of heat: The mechanism of my invention provides uniform distribution of infrared rays over the area to be heated from one or more independent, overhead, high temperature, horizontal, closed loop conduits each containing a uniform high level temperature fluid with large mass circulating rate, heated by one or more spaced apart heat sources located in series within the flowing stream. The spacing of these independent and individual closed loop conduits may be arranged so as to provide the best distribution of heat over the area below.

It may be helpful to note at this point that in understanding the distribution of infrared rays, the same laws in general apply thereto as apply for the distribution of light rays. As with overhead strip lighting, the heating conduits of my invention and discovery may be placed horizontally apart a distance equal to their height above the area to be heated, and may be placed horizontally from the perimeter of the area a distance equal to one half their height. Hence in a building which has a width not in excess of twice the ceiling height, a single loop of heating conduit will provide uniform distribution of heat over the floor area. Likewise, as with overhead lighting, the walls may reflect a large portion of the rays striking their surfaces at an oblique angle, into the adjacent perimeter floor area. The chilling effects of cold window and wall surfaces as well as skylight and roof surfaces are compensated by the distribution of infrared rays from the overhead heating conduits. Sweating of these cold surfaces is eliminated by heating them above the dew point by absorption of a portion of the infrared rays striking their surfaces either directly from the conduit surfaces or from the heated floor. The air inside the buildings is heated by draft free natural convection over the entire floor surface, which becomes heated by absorption of the overhead infrared rays. The temperatures of both the floor surface and the air in the building will be affected by the rate of air change at the floor level. In ventilated or noninsulated buildings with high ceilings, the heat loss may actually be reduced by opening the sides of the building above the occupancy level to the outside atmosphere, thereby permitting free circulation of outside cold air above the occupancy level and causing a reduction in the building stack effect and the rate of air change at the floor level. The insulated hoods of my invention extending below the heating surfaces of the conduit entraps an insulating blanket of heated air next to these surfaces forming a barrier against heat transfer or loss by convection currents and thereby permit free circulation of cold air under the ceiling surface without excessive heat loss.

Thus the mode of heat distribution of my invention and discovery adapts and converts for practical use and broadens the application of lightly-constructed buildings having large amounts of fresh air circulation, large window and skylight areas, and minimum insulation which type of construction is characterized by low cost building construction, large degree of natural lighting, solar heating, natural ventilating, and openings for noise dispersal. My invention provides for minimum building construction and yet optimum heating and environment conditions.

Heretofore local zone or spot heating sources of infrared rays using high cost electrical energy, or wasteful uninsulated combustion sources have been used for heating areas in industrial type buildings. The high cost of operation of these heating sources is further increased by their inherently poor seasonal efficiency during periods of only moderately cool weather. In contrast, the mechanism of my invention practically eliminates heat loss by convection from the heating surfaces, and is specially suited for modulated control of the heat output for sustained high seasonal operating efficiency while retaining the simplicity of control and maximum operating efficiency of each furnace with on-off operation of individual or groups of furnaces arranged in series within the stream of heating fluid in the heating conduit.

The heating effect of one conduit may be combined with that of another by close spacing of pairs of conduits (e.g. spaced apart a horizontal distance less than one-half their height above the floor) such as the adjacent conduits 101 and 102, and the opposite long sides of 100 of Figure 1; and a larger change in circulating fluid temperature may be allowed between furnace locations within each conduit without sacrificing uniformity of heat distribution over the area. The direction of flow of the circulating heating fluid (as shown by the direction of arrows) is opposite in these adjacent conduits and the furnaces are located and controlled so that the hottest portions of one conduit reinforce the heating effect of the less hot portions of the adjacent conduit. The spacing of pairs of heating conduits within one-half of their height above the floor improves the system dependability and increases the range of modulating heat output control while retaining uniform distribution over the area.

It is necessary that the infrared rays be produced at a sufficiently high intensity or concentration which will provide them at low cost and at the required amount for lightly constructed shelters in the colder sections (as airplane hangars in the Arctic zones) and seasons of the year. Obviously the means for producing the required amount of infrared heating for such lightly constructed buildings within economical considerations cannot involve the continuous extension of the infrared producing surface over the entire area as is done with heated ceiling devices used in conjunction with well insulated ceilings such as may be found in homes.

The circulating medium of my invention is a gaseous, non-toxic, lighter-than-ambient air, heating fluid such as air, water vapor, or carbon dioxide (the last two being non-combustible) providing for safe operation in the event of leakage. The use of lightweight gaseous heating fluids and arched, independently expandable conduit sheets provides for employing a thin wall construction for the conduits, thereby reducing the weight and cost of materials, and improving conduction heat transfer through the conduit walls.

The use of multiple heat sources in series arrangement within the circulating heating fluid stream provides for maintaining the heating fluid at a high level of temperature throughout the length of the heating conduit for uniform heat distribution, and provides for modulated building heat control by simple on-off operation of individual heat sources, and provides for small, lightweight furnace construction for simple overhead installation within the conduit. The mode of operation therefore provides safe, simple, lightweight construction further enhancing the use of my invention and discovery, particularly for buildings with light structures. Ordinarily the conduits would be placed very close beneath the overhead ceiling structure for most uniform distribution of the heat over the area to be heated. For this reason, the location of the conduit does not interfere with the operation and position of machinery and equipment such as cranes and the like.

As to efficiency of conduits and furnaces: On the one hand the diameter of the conduit has certain architectural and practical limitations as to its magnitude; on the other hand there is the positive necessity of providing for a sufficiently large mass of circulating fluid in proportion to the furnace heat output. Thus, while on the one hand such proportion must be provided, yet the size of the heating means must be of sufficiently large size so that the number of furnaces required for the heat output will not be excessive, yet such furnaces must be of sufficiently small size as to be disposable in the conduits. All this emphasizes and indicates the positive importance of efficiency in the heating source in providing said proportion and providing compactness to fit in the conduit. Another factor to be considered is the weight of the furnace which is to be inserted in the conduit and suspended overhead. Naturally this weight must be kept to a minimum in order to facilitate overhead installation.

The maintaining of the circulating medium in uni-directional flow at its relatively uniform elevated temperature renders the entire length of the conduit loop of my invention a continuous source of high intensity infrared heat resulting in efficient use of conduit materials and uniform heat distribution to the area below.

Moreover, in obtaining the mode of operation of my device and discovery, there must be considered the following important and essential cooperating relationships:

(1) The flow rate of the mass or weight of circulating fluid medium must be high in proportion to the unit heat input from the sources of heat disposed in series at intervals within the stream of this circulating fluid to limit the temperature variation of this fluid throughout the length of the continuous closed loop of the heating conduit.

(2) The temperature of the circulating fluid medium must be elevated to increase the intensity or rate of heat transfer manyfold over that commonly developed in fluid circulating heaters using water, air, or steam.

(3) The combination of the two features (1) and (2) gives a small temperature drop in relation to the average elevated temperature so that the change in the heat transfer rate is relatively small throughout the length of the conduit of my invention.

To develop the mass flow, of course, requires energy to operate the circulator mechanism, that is, the fan or blower and this energy, generally electrical, is relatively expensive. Therefore, the consideration in solving the problem along the lines of mode of operation above set forth in my invention and discovery involves limiting the capacity and head of the circulator within economical limits. In my invention, such energy for the circulator is relatively small, within the range of one or two percent, due to the uni-directional flow of the heating fluid in series with the heat sources at spaced intervals between portions of the conduit functioning as infrared heating surfaces, and due to the large conduit size made economically possible by employing a light gaseous heating fluid medium and very thin walled conduit construction.

Thus, the mode of operation involves a uniform high level temperature heat transfer fluid which is circulated at a large mass rate with a very minimum of cost at the same time within a very lightweight construction of conduit which not only operates as a means for defining the large stream of heating fluid in distributing and conducting the heat over the area to be heated but also functions as a source of infrared rays.

The means employed in my invention and discovery is particularly characterized by employing a continuous closed loop of heating conduit having a large cross sectional area, preferably formed of arched thin sheet material, and provided with an insulated hood extending below the exposed conduit surfaces, and containing one or more small compact heat sources, and one or more large circulating blowers.

The insulating hood over the walls of the heating conduit cooperates in eliminating the escape of heat through the upper sheet member 104 of the conduit and manifestly acts as an insulating means for the lower sheet which is the heating element providing the infrared heating of the area below and must therefore be exposed. This exposed lower sheet 103 of the conduit forming the infrared propagating heating element is insulated by a transparent blanket of heated air retained in contact with its surface by means of the laterally depending walls extending below the insulating hood greatly reducing the action of convection currents from removing this blanket of heated air in contact with the heating element.

The insulated hood of the conduit of my invention not only makes the heating means practical for buildings with open or uninsulated roofs but also improves the efficiency of heat distribution in buildings already provided with insulated ceilings.

The heating means of my invention, operating in conjunction with the insulated hood of my invention, has a higher operating temperature level than those devices operating in conjunction with insulated ceilings, since the hood prevents extension of the heat transfer surface to adjacent areas by convection and conduction. This higher operating temperature level cooperates in providing more uniform infrared heat production along the length of the conduit.

The upper sheet 104 of my invention is caused to operate to reduce the effective resistance to heat transfer from the circulating heating fluid to the lower sheet 103 forming the heating element. Approximately one-third of the total heat transferred through the lower sheet is supplied by infrared rays from the upper sheet.

Lower sheet has a larger temperature gradient through the circulating fluid film causing resistance to convection heat transfer, due both to its larger heat transfer rate and its smaller area. Thus the means employed in my invention of a thin sheet metal in the form in which it is used, which is a self-supporting form with arch-like strength principles involved, and the employment of an insulating hood 105 together with a body of entrapped air protecting the exposed lower sheet 103 provides a combination for exceedingly high efficient production of infrared rays and the employment thereof in heating the area to be heated. Moreover, all this is by means of a very economical construction. The employment of this type of means of thin sheet metal does involve the problem of expansion and this is taken care of in my invention by means of sliding grooved contacting edges as well as an offset end portion of the sheets in combination with a means 113 holding these in proper alignment. While other means for overcoming expansion may be employed, the means herein disclosed has been found simple, effective and economical. Furthermore, the expansion problem is complicated by the fact that during operation the upper sheet 104 (Fig. 3) is of a higher temperature than lower sheet 103 forming the conduit, and this difference in temperature requires provision for compensating such difference.

Relative to the result of my invention: The result of my invention and discovery produced by the mechanism set forth provides for freeing the architect of a building from limitations connected with the heating devices heretofore commonly employed. The mechanism of my invention has the result of providing for heating a large area by infrared rays without the aid and protection of well insulated walls or ceilings. In other words, the heating mechanism of my invention provides the result of heating areas by reason of its own construction independently of the building structure. This is why my invention is suitable for heating patios or outside areas such as found under the canopy around a swimming pool.

Moreover, the construction provides a highly efficient heating means in a very economical manner, employing simple sheet metal for the construction of the conduit and providing for such heating without the danger of a break in the conduit. If a break does occur in the conduit of my invention there would be merely hot air or gas escaping which would rise and dissipate. It is to be remembered that air and gases dissipate quickly when escaped from a confining means.

The advantages of infrared heating have been well established and my invention has the result of employing the advantages of infrared rays as a heating means in a highly efficient and economical mechanism. The result is facilitated by the fact that the circulating fluid is employed to maintain the walls of the conduit as an efficient source of infrared rays by causing the circulation of gaseous fluid medium of very elevated temperature and causing both the upper and lower walls to coordinate in producing the infrared rays. One of the results of my invention is the provision of a form of conduit that will give the necessary magnitude of surface area to provide the necessary amount of infrared rays, and at the same time of a cross sectional area that will enclose a stream of circulating medium at a flow rate that does not require excessive cost for power to operate the impeller.

The loop form of heating conduit of my invention not only distributes the heat over the area in a compact, simply constructed, continuous non-branching, horizontal circuit, but is particularly suited for uniform heat distribution together with modulated control of the building heat.

In developing the infrared radiation, there are two conflicting considerations involved. While on the one hand the result of my invention is dependent upon having a sufficient body of circulating medium, on the other hand such body of circulating medium must be disposed in a conduit of a shape which will provide optimum radiation. Thus the cross-sectional shape of the conduit is important in this connection of providing the radiation surface, but at the same time the cross-sectional area must be such as to permit of the rapid circulation of heating fluid medium in producing a large mass circulating rate in proportion to the heat input rate.

An important result of my invention and discovery is the uniformity of the temperature throughout all parts of the conduit which is to be maintained at an elevated temperature for the propagation of the infrared rays, and this is due among other factors to the fact that the primary sources of heat, that is, the furnaces, are disposed in series at spaced intervals in the conduit and an insulating hood is disposed over the conduit for preventing loss of heat by convection to the room air.

In devices without insulated hoods extending below their heated surfaces and in devices that do not provide for a high mass flow rate in proportion to the unit heat transfer rate between lengths of the heating conduit, the temperature drop is high in relation to the average temperature level, and very large changes in the heat transfer rate will occur along their heating surfaces having high temperature fluid inlet portions and the comparatively cold return outlet portions.

The highly satisfactory result of heating by means of infrared rays characterizing my invention and discovery is due in large measure to the fact that the circulating medium is impressed with a very high temperature and also that there is a very low temperature drop between the spaced sources of heat (furnaces) which operate to maintain the circulating fluid at a relatively uniform high temperature since the furnaces are in series with the heating elements forming the conduit within which the circulating medium flows.

The third factor or feature of my invention and discovery is the construction of the heat transfer surface for transferring heat from the primary heat source to the circulating heating fluid in the conduit. The material presenting the surface employed for the heat transfer in my invention is characterized by its lightness of weight, thinness of wall, and its compact arrangement so that it can be located between the wall of the combustion chamber and the wall of the conduit or the casing wall.

I provide this surface of an extended character and of a particular and novel form (providing not only extended surface but also paths of flow) within a small space and with relatively small drop in the pressure of the circulating fluid for economical circulation of a large mass flow rate of heating fluid.

Although a portion of the heat from the combustion chamber wall is transferred directly by convection to the circulating heating fluid, the major portion of the heat from the combustion chamber wall is transferred by radiation to the corrugated heat transfer surface of my invention and thence to the circulating heating fluid by convection. Since the mode of heat transfer from the combustion chamber wall forming the primary heating surface is predominantly by radiation, and varies with the fourth power of the temperature, more uniform and lower temperatures of the material constituting the primary source are attained at the operating range of heat transfer rate.

The outstanding features of the construction of the heat transfer surface are: its extreme thinness for lightweight and excellent heat conduction for transfer of the heat to opposite face, surface or plane; its deep corrugated form with its surface planes within the stream and parallel to the flow of the heat transfer fluid for combining a large extended area and compact form in contact with the heat transfer fluid, and an inexpensive means of dividing the stream of heat transfer fluid into a multiple of effectively small diameter flow paths, i.e. of small hydraulic diameter, for efficient convection heat transfer to the heat transfer fluid, together with uniform exposure of infrared rays from the primary surface for efficient absorption of these rays; its arrangement in staggered sections of short length for exposing opposite sides of alternate sections to each of the divided streams for uniform heating of each divided stream combined with improved convection heat transfer by increase in the turbulence of the stream caused by the disturbance of a large number of leading edges.

Furthermore, the extremely thin material used in the fabrication of the heat-transfer surfaces is particularly adapted for processing to dimple, rib, roughen or otherwise form, so as to further increase the useful turbulence of the heat-transfer gas contacting these surfaces.

Relative to the secondary heat transfer surface means: The secondary heat transfer surface means divides the major portion of the flow path area into effectively smaller diameter stream flow areas cross-sectionally considered and in this way increases the resistance of flow through this same portion so that an increased velocity is produced around the primary heat surface which is spaced a predetermined distance away from the secondary surface, causing an increase in convection heat transfer from said primary surface.

Figures 14, 15, 16:
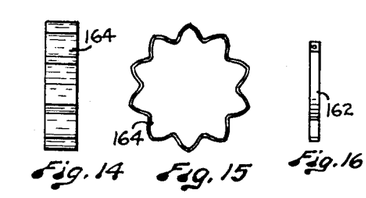
Fig. 14 is a view in side elevation of a secondary heat transfer member, a plurality of which are employed in coaxial alternate angular positions between the furnace casing and the combustion chamber wall.
Fig. 15 is a view in end elevation of said heat transfer member.
Fig. 16 is a longitudinal view in side elevation of the stack end yoke mounting member.

Said secondary surface formed of said multiplicity of short length corrugated units 164 with an arch or V-shaped construction provide a strengthening and reinforcing means for the conduit or shell about said heating source. Thus, it results that said shell or conduit may be constructed of thin material and thus reduce the weight of the mechanism which is a very important factor for the overhead construction, not only in providing an efficient conduit wall for development of the infrared radiant absorbing surface but also by way of economy of materials.

Relative to the second feature of my invention and discovery, the construction of the heat source: this feature has been dealt with in great detail hereinabove in connection with the description of the construction of the furnace or source of heat. The outstanding features of such construction are: its compact thin wall, lightweight combustion air preheater construction for providing efficient operation, including a relatively high heat transfer from the flue gas, despite the high temperature level of the circulating heating fluid; its single piece, thin wall, small diameter combustion chamber and flue extension shell for gas-tight construction eliminating need for induced draft and providing for simple insertion within the heating conduit; and its arrangement of independently expandable corrugated concentric shells providing for shallow and wide flow paths and thin walls for compact lightweight construction, thereby permitting the use of relatively expensive but corrosion-resistant materials.

Relative the application of the combustion chamber and air preheater of my invention as a direct source of very high intensity infrared heat: The infrared combustion heater of Fig. 37 may be used for uninsulated buildings in cold locations having very large heat losses, requiring a large total heat output and close spacing of the heat sources and where modulated control of the heat output and appearance do not have to be considered. As in lighting installations, adequate uniformity of distribution over the area can be obtained where the horizontal distances between sources both lengthwise and across the building do not exceed the ceiling height.

The air preheater is particularly important to obtain efficient operation of direct infrared heating combustion furnaces by removing heat from their high temperature flue gases. The flue gases of these furnaces have a high temperature upon leaving the combustion chamber where the heat is generated and from whence the useful heat is radiated. The weight and cost of high temperature insulation materials can be reduced by shortening the reflector hood covering the radiating surface by allowing the air preheater portion of the furnace to extend outside of the hood. Heat loss by convection transfer from the uninsulated portion of the preheater to the surrounding air can be reduced in this application by having the colder air path surround the flue gas path of the preheater.

The mechanism of my invention involves limitations as to size, as has been pointed out above. It cannot involve very large furnaces because these would not be disposable within a reasonable size conduit; at the same time the furnaces cannot be so small that they do not provide for the production of infrared rays of sufficiently high intensity per unit of length without an excessive number of said furnaces.

In selecting a size of mechanism for production of heat by the device of my invention and discovery, not only must the matter of heat capacity be considered but also the question of whether the furnace is one which will meet the most general requirements and at the same time is one which may serve as one of a multiplicity of units of the device to meet larger requirements. For example, a single combustion furnace having combustion means of dimensions hereinafter set forth will provide sufficient heat for 1000 square feet of floor area in a building having a heat loss of the order of 100 B.t.u. per hour per square foot of floor area.

For a mechanism embodying my invention and discovery the following proportions for the several components have been found to provide a satisfactory heating mechanism and one which may be used as one member of a multiple device. (N.B. All figures given are "of the order of" and not to be taken as indicating that some variation may not be made—developments in materials and special heating requirement may well involve changes in both size and proportion of the device. To name such considerations makes it evident that precise proportions and sizes cannot be given for all applications varying from airplane hangers to drying apparatus for industrial processing.)

(a) *Conduit.*—The conduit formed of a lower sheet of 3 feet in width and an upper sheet of 4 feet in width provides a crescent-shaped member with a central height for the conduit of over ½ foot—such provides for an efficient radiating extended surface and efficient cross-sectional flow area.

(b) *Furnace.*—A furnace burning from 1 to 2 gallons of fuel per hour is in accordance with common practice. Such a furnace may have a combustion chamber of about 1 foot in diameter and 2–3 feet in length so as to provide accommodations for an elongated flame of uniform temperature throughout its length of approximately the same size. The spacing of these furnaces within the conduit is determined by the building heating requirements and the conduit spacing. As one example, a 50-foot furnace spacing will result in a circulating air temperature of the order of 600° F. and a conduit surface temperature of 400° F. for a heat output per foot length of conduit of the order of 2400 B.t.u.'s per hour for heating 1200 square feet of floor area at a rate of 200 B.t.u.'s per hour per square foot.

(c) *Preheater.*—This may vary in length depending upon the economy or efficiency of fuel consumption desired. I have found a preheater of some 4 feet in length in conjunction with the above-described combustion chamber to be reasonably satisfactory with components of the sizes herein disclosed.

(d) *Furnace case.*—It is to be remembered that the conduit is to enclose the heat source or furnace together with the heat transfer means, i.e., the secondary heat transfer surface. I have found that such furnace casing may be of the order of 1½ feet in diameter.

(e) *Circulating fluid circulator.*—This should be of a capacity to handle about 1000–3000 c.f.m. of circulating heating medium, depending for the most part upon the permissible temperature variation of the heating fluid, which in turn may vary with the conduit spacing and ceiling height. The efficient use of conduit material is an important consideration in this connection.

Let it be noted that a surface type industrial preheater means in common use, which gives comparable results, is of the order of ten times the length of the preheater disclosed above for the invention herein set forth.

Respecting the control of the heating means embodied in my invention and discovery to reduce the heat when conditions permit, my said invention provides for such reduction in the number of operating furnace units by shutting them off thereby permitting the remainder of the operating furnace units to operate at full capacity, i.e., at their most optimum efficiency. It is to be noted that when throttling furnaces is attempted and they are caused to run at less than their designed capacity, then their efficiency is reduced accordingly. In other words, the units of my device need not be operated at partial capacity—there need be no throttling of the individual heat sources or furnaces of such units.

Since the circulating fluid of my invention is confined in a conduit to provide for efficient heating thereof, I provide a specially constructed furnace or heating means whereby the circulating fluid will be long exposed to the combustion heat, i.e., it will be in heat communicating relation for an extended length of the furnace. The furnace of my invention provides a furnace of small diameter which permits the furnace to be located within the conduit. A small diameter combustion chamber or flame is characterized by a large ratio of surface area to volume. The surface area varies directly with the diameter whereas the volume varies with the square of the diameter. In this connection I provide an elongated flame, i.e, a flame of generally small diameter and of a cylindrical form.

In the combustion chamber of my invention a large portion of the heat is transferred directly from the flame surface to the surrounding heat-transfer surfaces. The surface of the flame supplies this heat, and since this surface is large in relation to the volume of the flame especially high heat release rates are provided by my invention. A flame temperature and heat-transfer rate in the furnace of my invention is comparable to those of very much larger furnaces surrounded by relatively cold, water-jacketed heat absorbing surfaces.

By reason of the character of my invention, the furnace must be one of very light weight and at the same time of the utmost efficiency—all of which is best served by thin walls of sheet metal construction with a high heat-transfer rate. However, such condition requires the development in my invention of a heat transfer means of high surface temperature because in my invention the heat is being transferred to a gas.

In conclusion and by way of summary it is manifest that my invention and discovery is characterized by three primary and fundamental features: (a) distribution of heat over the area by a high temperature conduit of closed loop form disposed substantially horizontally; (b) combustion primary heat source characterized by its uniform high temperature combustion chamber and high heat-transfer rate of infrared rays of energy through and/or from the combustion chamber wall; and (c) special secondary heat-transfer surface of corrugated form characterized by its efficient absorption of said infrared rays from said combustion primary surface and its efficient transfer of said heat by convection to said circulating heating fluid in said loop conduit.

I claim:

1. An infrared radiant heating mechanism comprising a high temperature radiant overhead heating and heat distributing conduit situated in the upper portion of the space to be heated and formed by upper and lower arched sheets substantially in the form of a crescent, with its termini pointed downwardly, cross-sectionally considered, each of said sheets having its side edge portions formed with outwardly facing grooves, with those of the lower sheet in registration with and overlapping those of the upper sheet; a rigid aligning and supporting member located exteriorly on each side of said conduit at the said termini, the inner edge of which is engaged by the groove of the upper sheet in providing independent longitudinal expansion means between said upper and lower sheets and the said aligning supporting members, said conduit being disposed in a substantially horizontally continuous closed loop for series flow; a circulating heat-transfer gas of high temperature contained in said conduit for production of said high intensity infrared rays; a heat source in heat communicating contact with said circulating gas for transferring heat to said gas in maintaining the gas at a relatively high temperature at which said gas is productive of said infrared rays; and a circulator for causing circulation of said high temperature gas throughout said conduit for distributing the heat from said source over the area to be heated.

2. An infrared radiant heating mechanism comprising a high temperature radiant overhead heating and heat distributing conduit situated in the upper portion of the space to be heated and formed by upper and lower arched sheets substantially in the form of a crescent with its termini pointed downwardly, cross-sectionally considered, each of said sheets having its side edge portions formed with outwardly facing grooves, with those of the lower sheet in registration with and overlapping those of the upper sheet; a rigid aligning and supporting member located exteriorly on each side of said conduit at the said termini, the inner edge of which is engaged by the groove of the upper sheet in providing independent longitudinal expansion means between said upper and lower sheets and said aligning supporting members, said upper and lower arched sheets being provided with an overlapping offset portion on one end portion in receiving beneath said offset portion the end portion of the succeeding sheet, the received edge portion being fastened to said aligning and supporting member in providing for longitudinal expansion of the joint of said sheets, said conduit being disposed in a substantially horizontally continuous closed loop for series flow; a circulating heat-transfer gas of high temperature contained in said conduit for production of high intensity infrared rays, said temperature being maintained at a high level throughout the length of said conduit; a heat source in heat communicating contact with said circulating gas for transferring heat to said gas in maintaining the gas at a relatively high temperature at which said gas is productive of said infrared rays; and a circulator for causing circulation of said high temperature gas for providing for small temperature change of the circulating gas in proportion to the average temperature of said gas in providing a high intensity of infrared rays throughout the length of the conduit.

3. A heating mechanism comprising a conduit constituting a producer of heat, said conduit formed by upper and lower arched sheets substantially in the form of a crescent with its termini pointed downwardly cross sectionally considered, each of said sheets having its side edge portions formed with outwardly facing grooves, with those of the lower sheet in registration with and overlapping those of the upper sheet; a rigid aligning and supporting member located exteriorly on each side of said conduit at the said termini, the inner edge of which is engaged by the groove of the upper sheet in providing independent longitudinal expansion means between said upper and lower sheets and the said aligning supporting members; a circulating heat transfer gas in said conduit for production of said heat; a heat source for heating said gas; and a circulator for circulating said gas through said conduit.

4. A heating mechanism comprising a conduit constituting a producer of heat, said conduit formed by upper and lower arched sheets substantially in the form of a crescent with its termini pointed downwardly cross sectionally considered, each of said sheets having its side edge portions formed with outwardly facing grooves, with those of the lower sheet in registration with and overlapping those of the upper sheet; a rigid aligning and supporting member located exteriorly on each side of said conduit at the said termini, the inner edge of which is engaged by the groove of the upper sheet in providing independent longitudinal expansion means between said upper and lower sheets and the said aligning supporting members, said upper and lower arched sheets being provided with an overlapping offset portion on one end portion in receiving beneath said offset portion the end portion of the succeeding sheet, the received edge portion being fastened to said aligning and supporting member in providing for longitudinal expansion of the joint of said sheets; a circulating heat transfer gas in said conduit for production of said heat; a heat source for heating said gas; and a circulator for circulating said gas through said conduit.

5. A heating mechanism comprising a conduit constituting a producer of heat, said conduit formed by upper and lower arched sheets, each of said sheets having its side edge portions formed with outwardly facing grooves; a rigid aligning and supporting member located on each side of said conduit having inner edge portions for engaging the said grooves of said sheets, providing independent longitudinal expansion means between said upper and lower sheets and the said aligning and supporting members; a circulating heat transfer gaseous medium in said conduit for production of said heat; a heat source for heating said gaseous medium, and a circulator for circulating said gaseous medium through said conduit.

6. A heating mechanism according to claim 5, wherein said conduit has associated therewith downwardly extending side walls at the edges of said lower arched sheet, forming an air entrapping zone minimizing convection and conduction heat loss from the said conduit to the air in the area below said mechanism.

7. A low pressure heating system for providing uniform distribution of high intensity infrared heat over a living area or like expansive area to be space heated and particularly suited to heating an expansive area under an open or substantially uninsulated shelter, such system being characterized by a simple, closed loop conduit arranged proximately over said area, a circulator in said conduit for recirculating a heated gaseous medium in the conduit at a high flow rate to maintain the temperature thereof substantially uniform throughout said conduit, fuel fired burner means in said conduit, and means exhausting the products of combustion from said burner means without admixture of such products of combustion with the recirculating gaseous medium, the flow rate of said gaseous medium being sufficiently high in proportion to the heating capacity of said fuel fired burner means to provide only a small variation in the temperature of said gaseous medium throughout said conduit, the total heat input to said gaseous medium maintaining a temperature level throughout said conduit sufficiently high to cause infrared ray emission from the lower surface of said conduit throughout its length.

8. A heating mechanism comprising a conduit constituting a producer of high intensity heat throughout its length, said conduit being disposed in the form of a continuous closed loop arranged over and exposed throughout its length to an area to be spaced heated; a circulating heat-transfer gaseous medium contained in said conduit; a circulator in said conduit recirculating said heat-transfer gaseous medium therethrough at a high flow rate; and a series of fuel fired heat sources arranged at substantially equally spaced intervals along the length of said conduit in heat communicating contact with said heat-transfer gaseous medium in providing sufficient heat for said heat-transfer gaseous medium to maintain the temperature level of the recirculating gaseous medium sufficiently high to cause infrared ray emission from the surfaces of said conduit throughout its length, said gaseous medium successively passing each of the said fuel fired heat sources and the heat radiating portions of said conduit between said multiple fuel fired heat sources, and each of said multiple fuel fired heat sources including means exhausting the products of combustion therefrom without admixture of such products of combustion with the recirculating gaseous medium.

9. An infrared radiant heating mechanism comprising a closed circuit conduit having a lower surface with lateral edges disposed relatively downwardly to form a trapped air space for said conduit lower surface said conduit being disposed in the form of a continuous closed circuit loop in the upper portion of a space to be heated with at least a substantial portion of its length horizontal; a gaseous circulating medium in said conduit; multiple heat sources at spaced intervals along the length of and enclosed in said conduit for heating said gaseous circulating medium; and a circulator for circulating said medium around said conduit, said multiple heat sources maintaining the temperature level of the said medium sufficiently high to cause heat emission of predominantly infrared character from the surfaces of said conduit throughout its length.

10. An infrared radiant overheat heating mechanism comprising a heating conduit at infrared radiant temperature disposed substantially horizontally in the upper portion of the space to be heated; a heat insulating hood for said conduit with sides extending below said conduit at both sides thereof, forming a trapped air space substantially the width of said conduit and insulating the same against convection heat transfer; a circulating heat-transfer gaseous medium contained in said conduit; a heat source enclosed in said conduit in contact with said circulating gaseous medium for transferring heat to said gaseous medium and a circulator for said gaseous medium, recirculating the same in said conduit at a high flow rate.

11. An infrared radiant overhead heating mechanism comprising a high temperature radiant overhead heating and heat distributing conduit of thin sheet material constituting a radiating surface producing high intensity infrared rays throughout its length, said conduit being in the form of a substantially horizontally disposed continuous closed loop in the upper portion of the space to be heated for substantially unidirectional and series flow; a hood having side walls substantially conforming to the upper form of said conduit cross-sectionally considered, said side walls extending below said conduit at both sides thereof, forming a trapped air space substantially the width of such conduit and insulating the same against convection heat transfer from said conduit and the conduit heating surface at a high temperature level producing high intensity infrared rays throughout its length; a recirculating heat-transfer gas contained in said conduit; a heat source enclosed in said conduit in heat transferring relation with said circulating gas for transferring heat to said gas and maintaining the gas at a relatively high temperature at which conduit surfaces heated by said gas is productive of said infrared rays; and means circulating said high temperature gas in said conduit at a relatively high flow rate, causing radiation of high intensity infrared rays throughout the length of the conduit.

12. An infrared radiant heating mechanism comprising a closed circuit conduit having a lower surface with lateral edges disposed relatively downwardly, said lower surface and lateral edges forming a trapped air space under said conduit lower surface, said conduit being disposed in the form of a continuous closed circuit loop in the upper portion of a space to be heated with at least a substantial portion of its length horizontal; a gaseous circulating medium in said conduit; heat source means enclosed in said conduit for heating said gaseous circulating medium; and a circulator for circulating said medium around said conduit, said heat source means maintaining the temperature level of the said medium sufficiently high to cause heat emission of predominantly infrared character from the surfaces of said conduit throughout its length.

13. An infrared radiant heating mechanism comprising a closed circuit conduit, means running longitudinally of and extending below the lower surface of said conduit at the sides thereof, said lower surface and means forming a trapped air space substantially the width of the conduit and lying below the same, said conduit being disposed in the form of a continuous closed circuit loop in the upper portion of a space to be heated with at least a substantial portion of its length horizontal; a gaseous circulating medium in said conduit; heat source means enclosed in said conduit for heating said gaseous circulating medium; and a circulator for circulating said medium around said conduit, said heat source means maintaining the temperature level of the said medium sufficiently high to cause heat emission of predominantly infrared character from the surfaces of said conduit throughout its length.

References Cited in the file of this patent

UNITED STATES PATENTS

| | | | |
|---|---|---|---|
| 2,218,404 | Olson | Oct. 15, | 1940 |
| 2,499,207 | Wolfersperger | Feb. 28, | 1950 |
| 2,523,332 | Riehl | Sept. 26, | 1950 |
| 2,531,810 | Fyffe | Nov. 28, | 1950 |
| 2,541,171 | McGarry | Feb. 13, | 1951 |
| 2,559,869 | Gay | July 10, | 1951 |
| 2,561,290 | Payant | July 17, | 1951 |
| 2,577,441 | Zaniroli | Dec. 4, | 1951 |
| 2,625,150 | Little | Jan. 13, | 1953 |
| 2,647,506 | Heiman | Aug. 4, | 1953 |
| 2,764,969 | Weiss | Oct. 2, | 1956 |

FOREIGN PATENTS

| | | | |
|---|---|---|---|
| 495,557 | Belgium | May 31, | 1950 |
| 1,086,133 | France | Oct. 30, | 1953 |
| 108,204 | Great Britain | July 31, | 1917 |
| 619,251 | Great Britain | Mar. 7, | 1949 |
| 451,579 | Italy | Sept. 20, | 1949 |